(12) United States Patent
Hintzke et al.

(10) Patent No.: US 6,942,280 B2
(45) Date of Patent: Sep. 13, 2005

(54) SYSTEM FOR ATTACHING COLORED INSERT TO VEHICLE FRAME ASSEMBLY

(75) Inventors: Greg Hintzke, Farmington Hills, MI (US); Joseph J. Randazzo, Fraser, MI (US); William R. McGrail, Pleasant Ridge, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 10/460,033

(22) Filed: Jun. 12, 2003

(65) Prior Publication Data

US 2004/0251714 A1 Dec. 16, 2004

(51) Int. Cl.[7] .............................. B60J 1/10; B62D 29/04
(52) U.S. Cl. .............................. 296/181.2; 296/146.15; 296/901.01; 296/35.1; 296/191
(58) Field of Search ........................... 296/191, 193.04, 296/181.2, 190.01, 201, 146.3, 146.15, 96.21, 181.3, 146.5, 901.01, 35.1; 52/573.1

(56) References Cited

U.S. PATENT DOCUMENTS

| | | | |
|---|---|---|---|
| 4,261,613 A | | 4/1981 | Alford |
| 4,712,341 A | * | 12/1987 | Harris et al. ............. 296/96.21 |
| 4,841,696 A | | 6/1989 | Miller |
| 4,932,454 A | | 6/1990 | Swope |
| 5,306,535 A | | 4/1994 | Shaffer |
| 5,419,605 A | | 5/1995 | Puaatuua |
| 5,570,542 A | | 11/1996 | Cameron |
| 5,647,631 A | * | 7/1997 | Lee .......................... 296/146.5 |
| 5,695,236 A | * | 12/1997 | Banno et al. ............. 296/96.21 |
| 5,704,173 A | * | 1/1998 | Repp et al. ................. 296/201 |
| 5,957,524 A | | 9/1999 | Feder |
| 6,187,233 B1 | | 2/2001 | Smith |
| 6,196,607 B1 | * | 3/2001 | Gulisano ............... 296/901.01 |
| 6,293,609 B1 | | 9/2001 | Xu et al. |
| 6,299,235 B1 | | 10/2001 | Davis et al. |
| 6,319,438 B1 | | 11/2001 | Smith et al. |
| 6,378,931 B1 | * | 4/2002 | Kolluri et al. ............... 296/201 |
| 6,435,602 B1 | * | 8/2002 | Sukegawa et al. ......... 52/573.1 |
| 6,487,823 B2 | | 12/2002 | Lagrue |
| 6,769,853 B2 | * | 8/2004 | Perrot ......................... 296/191 |

* cited by examiner

*Primary Examiner*—Jason Morrow
(74) *Attorney, Agent, or Firm*—Nixon & Vanderhye P.C.

(57) ABSTRACT

In certain example embodiments, a single type of vehicle frame member may be used for both first and second vehicle types, where the frame member includes at least one window frame opening defined therein. In making the first vehicle type, the window frame opening(s) is/are filled with windows in a known manner. When making the second vehicle type, one or more of the frame openings is/are filled with a colored polymer based insert which is of a color(s) which compliments the exterior color(s) of the vehicle. In other example embodiments (which may or may not be used in conjunction with the aforesaid embodiment), an attachment member for mounting an insert in a frame opening is designed to allow at least part of the attachment member to slide relative to an insert to which it is mounted. In certain instances, the attachment member may include a spring biased clip, while in other instances it may include a slidable stud support.

31 Claims, 19 Drawing Sheets

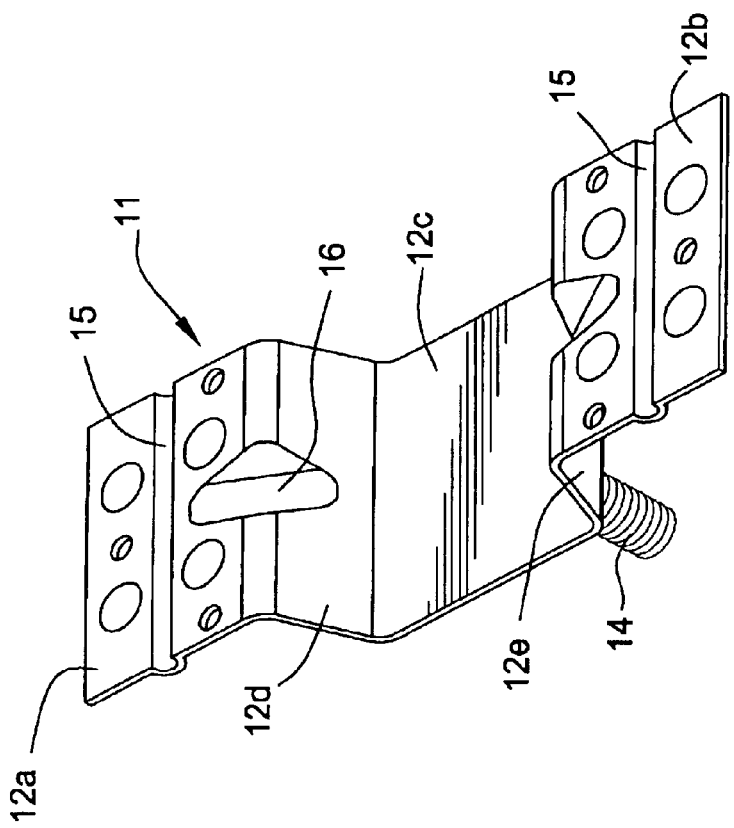
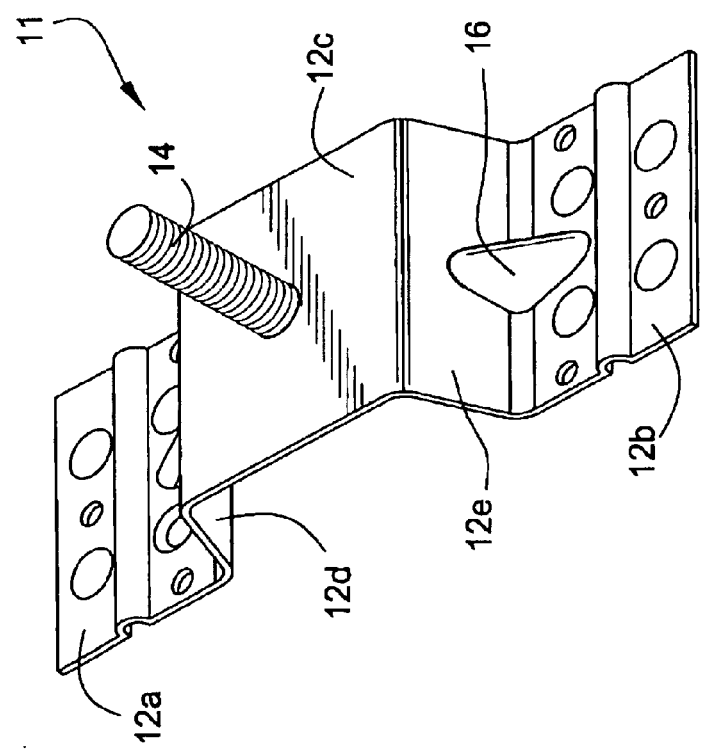

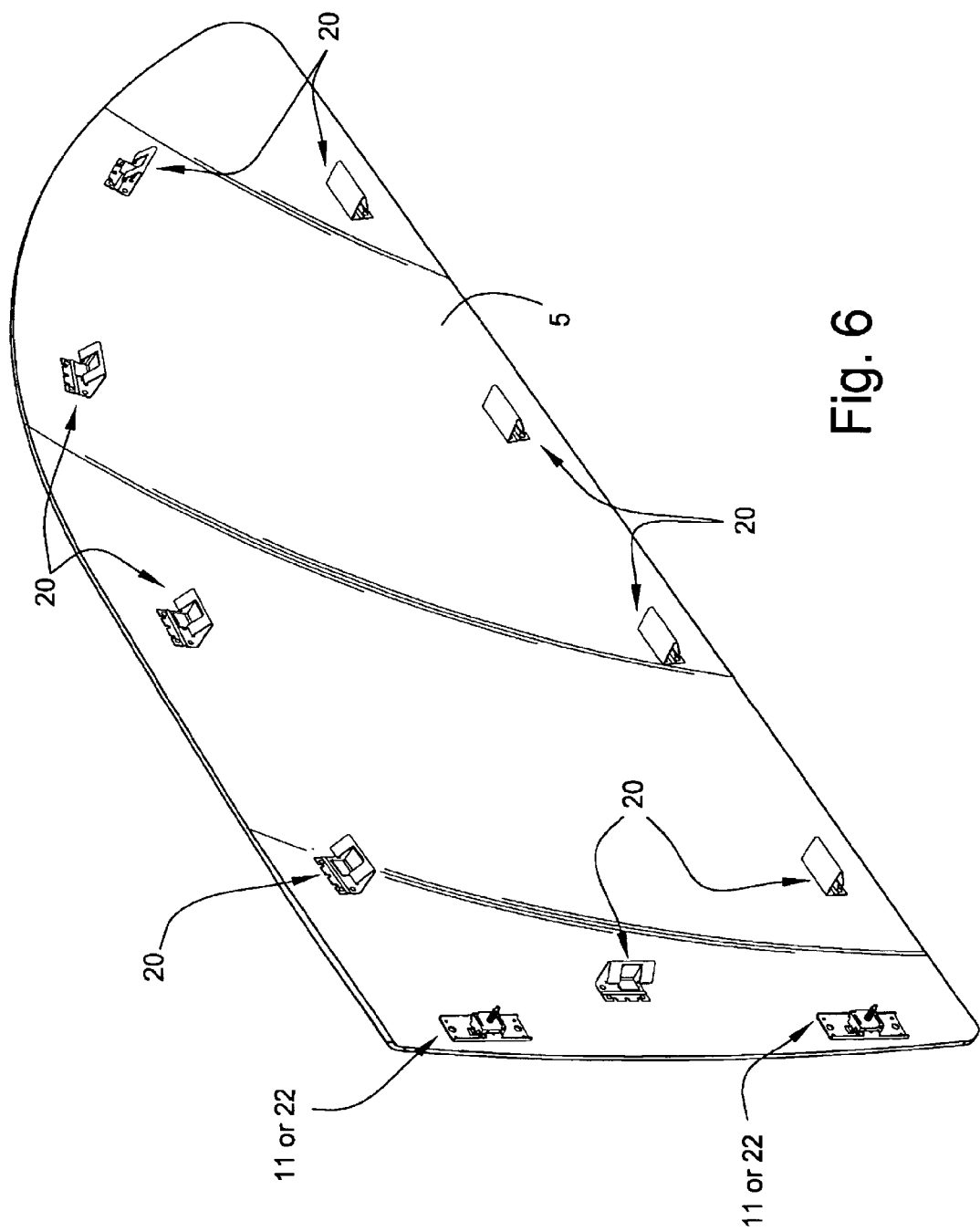

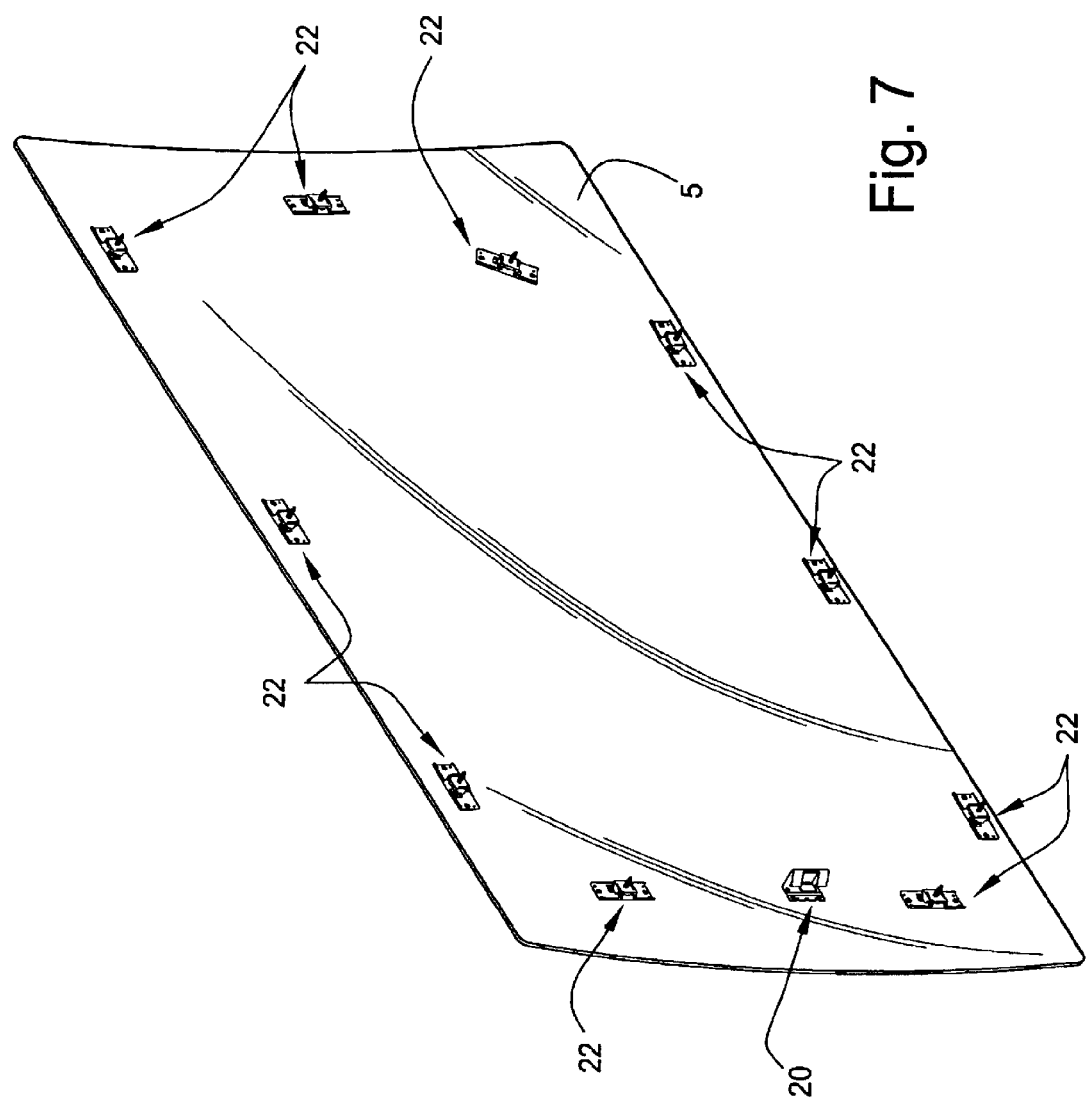

SYSTEM FOR ATTACHING COLORED INSERT TO VEHICLE FRAME ASSEMBLY

This invention relates to a system for attaching a colored insert to a vehicle frame assembly. In certain example embodiments, a system is provided which enables a colored insert to be attached to a vehicle window frame assembly in a manner such that after attachment the colored insert is capable of sliding in multiple directions relative to the frame assembly (e.g., due to thermal expansion/contraction of the insert relative to the frame assembly).

BACKGROUND AND SUMMARY OF THE INVENTION

Both passenger vans and cargo vans are known in the art. Passenger vans typically have side rear windows located at the opposing rear quarters of the van so that passengers in the van can see outside of the vehicle during travel and the like. On the other hand, cargo vans are similar to passenger vans in many respects, except that they do not include the side rear windows on the opposing rear quarters. Since cargo vans are often used for commercial purposes (e.g., hauling supplies such as paint, ladders, tools, and the like), the rear quarters of such vans are typically solid metal and the aforesaid windows are not provided due to the potential for breakage.

Unfortunately, similar passenger vans and cargo vans have in the past required vastly different frames due to the requirement in one type van for window(s) in a given location(s) (passenger van), and the need in the other type van for non-window structure(s) in the same location(s). In particular, passenger van frames have been provided with window frame opening(s) at the rear quarter(s) of the vehicle, whereas cargo van frames have not been provided with such window frame opening(s) since no side rear windows are provided therein. The necessity of using vastly different frames (e.g., one with window frame openings and the other without such window frame openings) is sometimes burdensome with respect to cost, assembly line procedures, and/or the like.

Accordingly, in certain example embodiments of this invention a single type of vehicle frame may be used for both passenger vans and cargo vans (or other vehicle types in other embodiments). The type of vehicle frame which may be used for both passenger and cargo vans includes window frame opening(s) at the rear quarter area(s) thereof on at least one side, even though only one of the van types (i.e., the passenger van) uses a window(s) at this location(s). The frames for both the passenger and cargo vans need not be the same in all respects, but they are similar in that both include window frame opening(s) at certain area(s) thereof. In making passenger vans, the window frame opening(s) are filled with windows in a known manner. On the other hand, when making cargo vans, one or more of the window frame openings is filled with an opaque colored polymer based insert which is of a color(s) which substantially matches and/or complements the exterior color(s) of the vehicle. By designing window frame opening(s) to accept both windows and opaque colored polymer based inserts, respectively, a single frame type can be used for different vehicle types which can reduce costs and/or assembly line burdens in the process of vehicle manufacture.

Expansion and contraction due to temperature changes is not a significant problem with respect to glass windows attached to metal (e.g., steel) vehicle frames, because the thermal coefficients of expansion/contraction of glass and steel are not that different. On the other hand, the thermal coefficients of expansion/contraction of the aforesaid polymer based inserts and the metal vehicle window frames in which they are mounted are significantly different. In particular, the plastic of the polymer based inserts expands much more than does the metal frame (e.g., of steel or the like) upon significant increases in temperature, and thus contracts much more than the metal frame upon significant decreases in temperature.

It has unfortunately been found that if the aforesaid opaque colored polymer based inserts are attached to the metal window frames in the same manner that glass windows are attached to the window frames (i.e., with only fixed stud attachments), the thermal expansion/contraction of the inserts will cause the fixed stud attachments to shear off (i.e., break) thereby causing system failure.

In view of the above, in certain example embodiments of this invention, special attachment members have been designed so as to allow at least part of the attachment(s) to slide relative to the opaque colored polymer based insert to which it is mounted. In certain embodiments, an attachment member is designed with a slidable stud support which is adapted to slide in at least one direction relative to the insert to which it is mounted.

In certain example embodiments of this invention, the slidable stud support comprises at least one sacrificial member (e.g., tab, pin, or the like) which is adapted to prevent significant movement of the support relative to the insert when the support and stud are originally attached to the insert. Thereafter, the sacrificial member(s) is adapted to break off upon significant thermal expansion and/or contraction. The breaking off of the sacrificial member(s) enables the stud to thereafter slide in at least one direction relative to the insert to which it is mounted, thereby enabling the insert to slide in at least one direction relative to the metal frame to which it is mounted so as to prevent or reduce system failures due to temperature changes.

In certain example embodiments of this invention, there is provided a method of making first and second types of vehicles, the method comprising: providing a vehicle frame member that is useable in both the first and second types of vehicle, the frame member including at least one flange portion for receiving either a window or an opaque colored polymer based insert; determining whether the vehicle to be made is to be the first type of vehicle or the second type of vehicle; when the vehicle to be made is to be the first type of vehicle, attaching the window to the frame member; and when the vehicle to be made is to be the second type of vehicle, attaching the opaque colored polymer based insert to the frame member.

In other example embodiments of this invention, there is provided a vehicle comprising: a frame member; an opaque colored polymer based insert attached to the frame member via at least one attachment member; and wherein said attachment member allows the opaque colored polymer based insert to slide in at least one direction relative to the frame member after the insert has been attached to the frame member.

In other example embodiments of this invention, there is provided an attachment member for attaching a component to a frame member of a vehicle, the attachment member comprising: a base support member defining at least one channel, the base support member adapted to be mounted on the component; a slider adapted to slide in a first direction of said channel; and a stud support member which supports an attachment stud to be received by the frame member of the vehicle, wherein the stud support member is adapted to slide on the slider in a second direction which is different than the first direction to that the attachment member is adapted to allow the component to slide in at least first and second directions relative to the frame member; and wherein at least part of the slider is located between the base support member and the stud support member.

In other example embodiments of this invention, there is provided an attachment member for attaching a component to a frame member of a vehicle in a manner such that after being attached to the frame member the component is able to slide in at least one direction relative to the frame member, the attachment member comprising: a base support member adapted to be mounted on the component; and sacrificial means, including at least one sacrificial member, for breaking off after the component has been attached to the frame member via the attachment member, so that the component is able to slide to a greater extent in the at least one direction relative to the frame member after the sacrificial member has broken off than before the sacrificial member breaks off.

In still other example embodiments of this invention, there is provided an attachment member for attaching a component to a frame member of a vehicle in a manner such that after being attached to the frame member the component is able to slide in at least one direction relative to the frame member, the attachment member comprising: a base portion adapted to be mounted on the component; and first and second spring biased angled members operatively connected to the base portion, a support portion connected to the spring biased angled members, and wherein a portion of the frame member is to be slidably received between: (a) distal ends of the spring biased angled members, and (b) the support portion.

BRIEF DESCRIPTION OF THE DRAWINGS

FIGS. 5(a) and 5(b) are perspective views illustrating a typical attachment structure with a fixed stud which may be used in attaching the window to the window frame in FIG. 4.

FIG. 6 is a perspective view illustrating various attachment members mounted on an opaque colored polymer based insert, at least some of the attachment members for enabling the insert to be attached to a vehicle window frame in a slidable manner.

FIG. 7 is a perspective view illustrating various attachment members mounted on another opaque colored polymer based insert, at least some of the attachment members for enabling the insert to be attached to a vehicle window frame in a slidable manner.

DETAILED DESCRIPTION OF EXAMPLE EMBODIMENTS OF THE INVENTION

Figure 1:
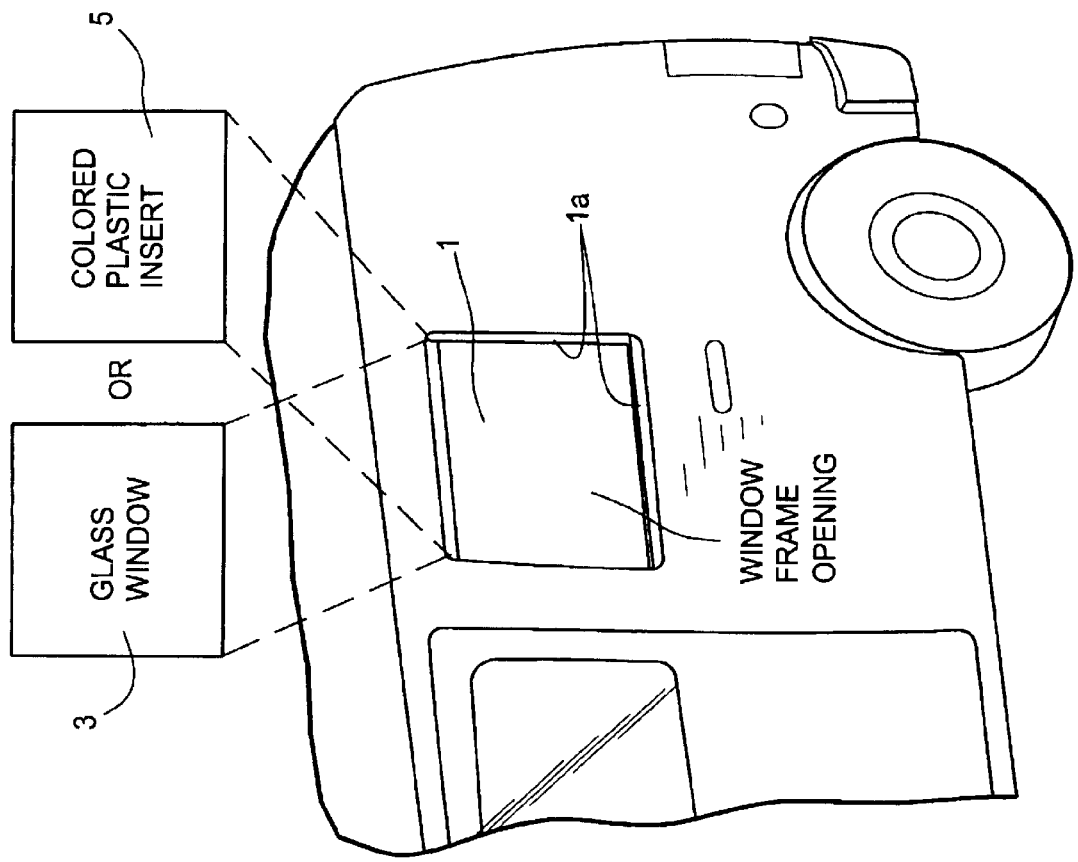
FIG. 1 is a schematic diagram illustrating how either a glass window or a polymer based colored insert may be attached to a vehicle via the same window frame opening according to an example embodiment of this invention.

Referring now more particularly to the accompanying drawings in which like reference numerals indicate like parts throughout the several views.

While the example embodiments below are described with respect to passenger and cargo vans, this invention is not so limited. Attachment systems according to certain embodiments of this invention may be used to enable attachment of polymer based products (e.g., inserts, trim products, etc.) to metallic or other frame members in any sort of vehicle. In other embodiments of this invention, attachment systems herein may be used to enable attachment of glass or metallic members (e.g., windows, inserts, trim products, etc.) to polymer based frame members in any sort of vehicle. Moreover, while described below for purposes of example and understanding, this invention is not limited to situations where the same frame member is used in multiple types of vehicle.

In certain example embodiments of this invention, a single type of vehicle frame may be used for both passenger vans and cargo vans (or other vehicle types in other embodiments). The type of vehicle frame which may be used for both passenger and cargo vans includes window frame opening(s) at the rear quarter area thereof on at least one side, even though only one of the van types (i.e., the passenger van) uses a window(s) at this location(s). The frames for both the passenger and cargo vans need not be the same in all respects. In making passenger vans, the window frame opening(s) are filled with windows in a known manner. On the other hand, when making cargo vans, one or more of the window frame openings is filled with an opaque colored polymer based insert which is of a color(s) which substantially matches and/or complements the exterior color(s) of the vehicle. By designing window frame opening(s) to accept both windows and opaque colored polymer based inserts, respectively, a single frame type can be used for different vehicle types.

In other embodiments of this invention (which may or may not be used in conjunction with the aforesaid embodiment where a single type of frame is used for multiple vehicle types), special attachment members for attaching polymer based inserts to metal frame members have been designed so as to allow at least part of the attachment member(s) to slide relative to the insert to which they are mounted, and also to slide relative to the frame to which the attachment member(s) are mounted. In certain example embodiments, a attachment member may comprise a spring biased clip. In other example embodiments, an attachment member is designed with a slidable stud support which is adapted to slide in at least one direction relative to the insert to which it is mounted. In such embodiments, the slidable stud support comprises at least one sacrificial member (e.g., tab, pin, or the like) which is adapted to prevent significant movement of the support relative to the insert when the support and stud are originally attached to (mounted on) the insert. Thereafter, the sacrificial member(s) is/are adapted to break off upon significant thermal expansion and/or contraction of the insert relative to the frame. The breaking off of the sacrificial member(s) enables the stud to thereafter slide in at least one direction relative to the insert to which it is mounted, thereby enabling the insert to slide in at least one direction relative to the metal frame to which it is mounted so as to prevent or reduce system attachment failures due to temperature changes.

Figure 2:
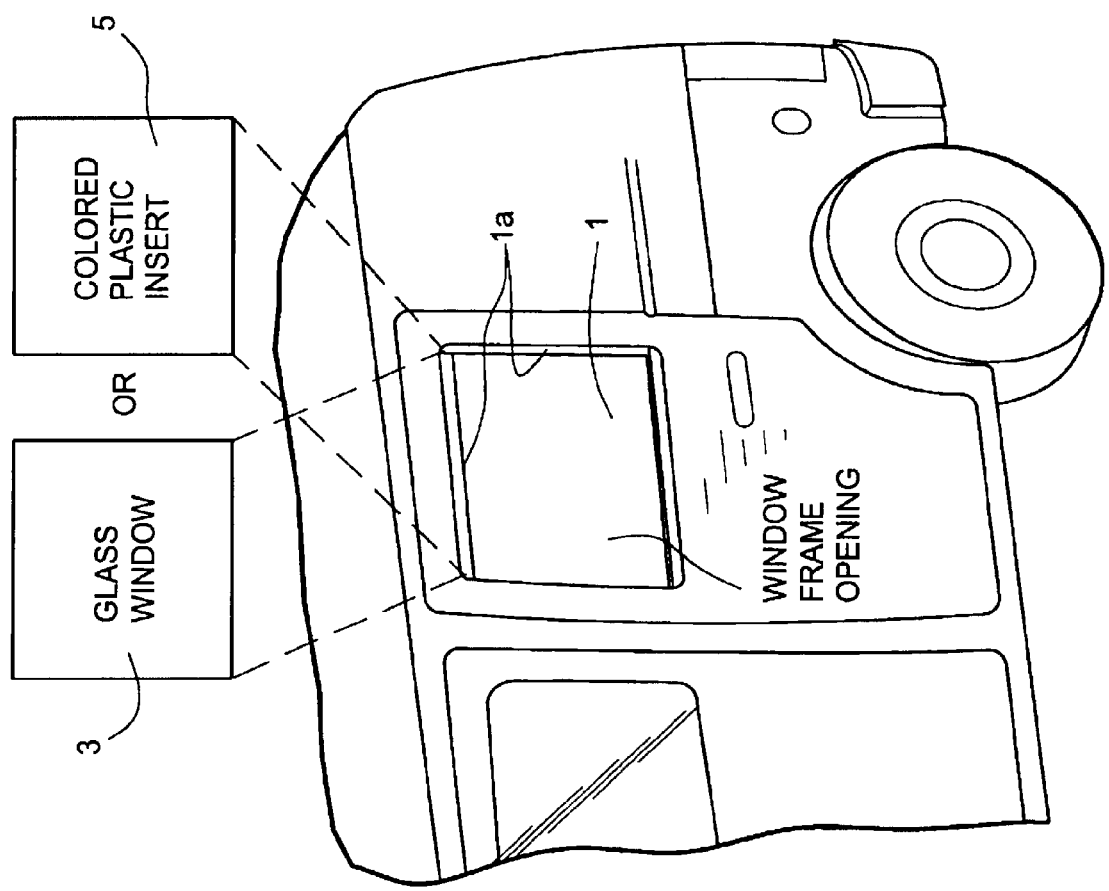
FIG. 2 is a schematic diagram illustrating how either a glass window or a polymer based colored insert may be attached to a vehicle via the same window frame opening according to an example embodiment of this invention, this embodiment different from the FIG. 1 embodiment in that the window frame opening in the FIG. 2 embodiment is located in a door structure of the vehicle.

FIGS. 1–2 are schematic views of vehicles according to example embodiments of this invention. The vehicles illustrated in FIGS. 1–2 are vans, for purposes of example and without limitation. The vehicles in FIGS. 1–2 each include at least one window frame opening 1 defined at a rear quarter panel area (which includes the rear side door area in FIG. 2) of the van, on one or both sides of the vehicle. Part or all of the window frame opening 1 is defined around its periphery by a window frame 1a. Window frame 1a is typically of a metal (e.g., steel), although other materials may instead be used.

It can be seen in FIGS. 1–2 that the vehicle window frame opening 1 is adapted to received either a glass window 3 or an opaque colored polymer based insert 5, depending upon what type of van is desired. Substantially transparent windows, or alternatively privacy windows, may be used in different embodiments. For example, when a passenger van is desired (which typically includes many windows), a window 3 is mounted in the window frame opening 1 (on one or both sides of the van) and thus attached to window frame 1a. However, when a cargo van is desired (which typically has a reduced number of windows), the polymer based colored insert 5 is mounted in the same window frame opening(s) 1 and thus attached to window frame 1a. The window frame 1a includes a plurality of apertures (not shown in FIGS. 1–2) defined therein at various locations for receiving studs of respective attachment members (not shown in FIGS. 1–2) mounted on the window 3 and/or insert 5 to enable the mounting of the window/insert in opening 1. Because the same window frame opening 1 can receive both a glass window 3 and an opaque colored plastic insert 5, the same frame or frame portion (frame member) 1a can be used for two different types of vehicles (e.g., passenger vans and cargo vans for example). This represents a reduction in cost and/or assembly line burdens.

It is noted that the terms "frame" and "frame member" as used herein do not refer to the entire vehicle frame. Instead, these terms may refer to frame portions which may be localized on the vehicle; for example, these terms may refer to a portion of a vehicle which is provided proximate an opening which is to receive at least one of a window 3 or an insert 5. In this respect, a "frame member" herein can be any part of a vehicle which is capable of supports a window and/or another component such as a colored insert 5. Frame members may be metal (preferred), although such members may be made of other materials in other embodiments of this invention.

The locations of the respective window openings 1 in FIGS. 1–2 are provided for purposes of example only, and are not intended to be limiting. Such window frame opening(s) 1 may be located at any suitable location on any type of vehicle according to different embodiments of this invention.

Figure 3:
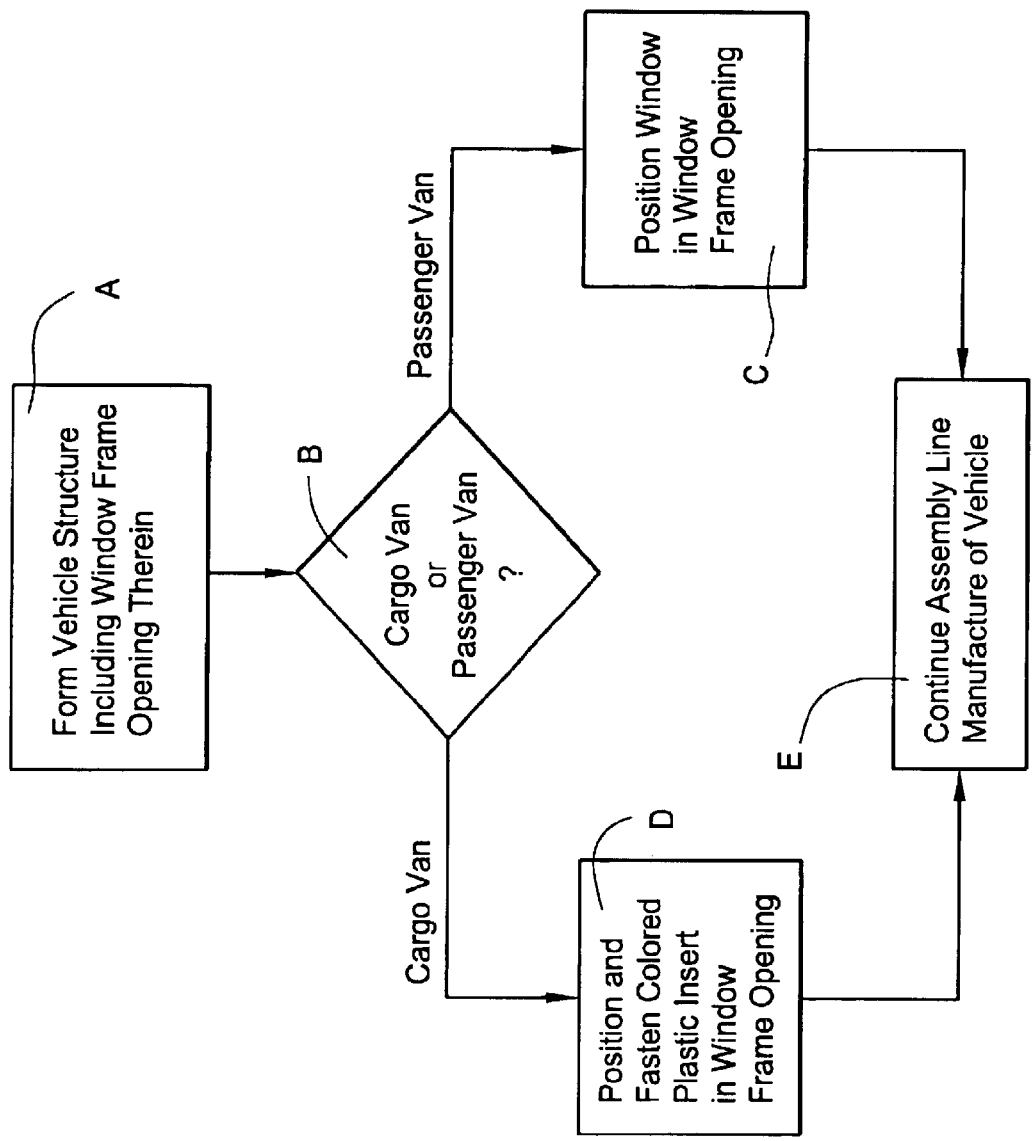
FIG. 3 is a flowchart illustrating certain example steps which may be taken in making a vehicle according to the FIG. 1 and FIG. 2 embodiments of this invention.

FIG. 3 is a flowchart illustrating certain example steps which are performed in making a vehicle according to example embodiments. Initially, a vehicle structure is provided which includes at least one window opening 1 defined at least partially by a window frame 1a (step A in FIG. 3). Then, a determination is made as to whether it is desired to make a first type of vehicle (e.g., passenger van) or a second type of vehicle (e.g., cargo van), where the first type of vehicle has more windows than the second type of vehicle (step B in FIG. 3). If it is desired to make the first type of vehicle (e.g., passenger van), then glass window(s) 3 is/are mounted to window frame(s) 1a so that the window(s) is/are thereby mounted in window opening(s) 1 (step C in FIG. 3). On the other hand, when it is desired to make the second type of vehicle (e.g., cargo van with less windows), then opaque colored polymer based insert(s) 5 is/are mounted to window frame(s) 1a so that the insert(s) is/are thereby mounted in respective window opening(s) 1 (step D in FIG. 3). After the window opening(s) 1 has been filled with either the glass window 3 or the opaque colored insert 5, the assembly line process of manufacturing the vehicle continues (step E in FIG. 3).

The color of insert 5 is selected to substantially match or otherwise complement the exterior color(s) of the vehicle. For example, if the exterior of the vehicle is colored white, the insert 5 may also be colored white, or any other suitable color which complements the white color of the vehicle. As another example, if the vehicle is colored blue, the insert 5 may be colored blue, black, white, or the like in order to substantially match (if blue) or compliment (if black, white, or any other suitable color) the blue color of the vehicle.

Figure 15:
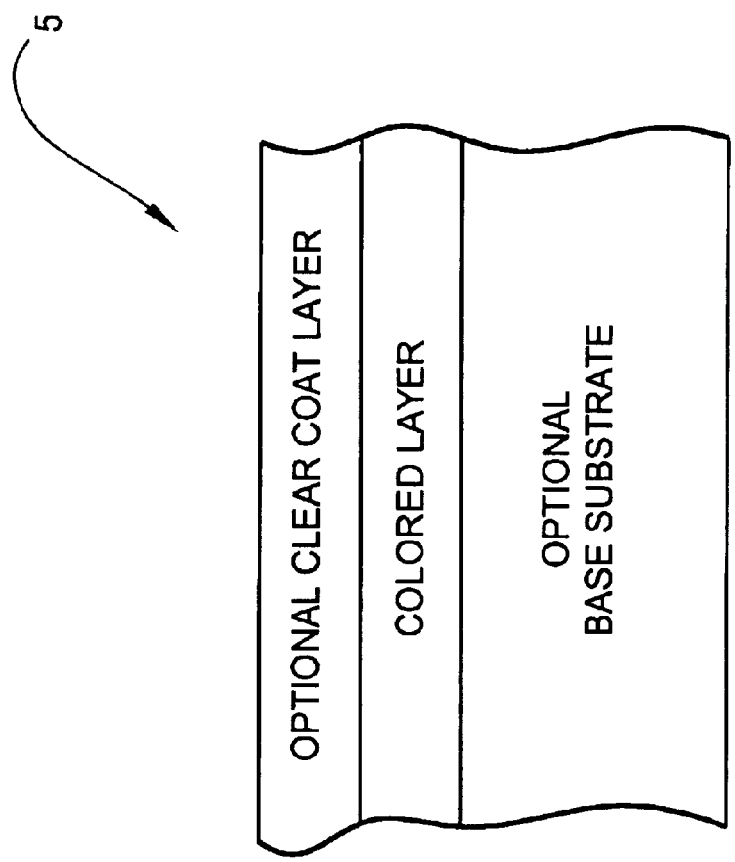
FIG. 15 is a cross sectional view of an example opaque colored insert according to an example embodiment of this invention.

Colored insert 5 may be made of a single polymer based layer including color pigment and/or metallizing particles (e.g., Al, Ni, NiCr, Cr or any other suitable metal flakes) in certain example embodiments of this invention. This colored polymer based layer may be made of or comprise one or more of the following materials in certain example non-limiting embodiments of this invention: thermoplastic polyolefin (TPO), glass-filled polycarbonate, Montell Hivalloy polyolefins, amorphous polymer, polypropylene, polyethylene, TPU, PBT, nylon, surlyn, polystyrene, acrylonitrile-butadiene-styrene (ABS), polycarbonate, PVC, and/or mixtures thereof. Other materials may also be used. Optionally, the colored layer may have a substantially transparent clear coat (e.g., of or including a thermoplastic fluorinated polymer, or any other suitable material) provided thereover; and/or may be supported by a polymer based substrate (e.g., of or including polycarbonate, ABS, TPO, PVC, any of the polymers listed above, or mixtures thereof (e.g., see FIG. 15). One or more tie layer(s) may optionally be provided between the colored layer and the clear coat layer in certain example instances. Example non-limiting colored inserts 5 are disclosed in U.S. Pat. Nos. 6,319,438, 6,187,233, 5,037,680, 5,725,712, and WO 99/08870, the disclosures of which are hereby incorporated herein by reference. Moreover, colored inserts 5 may be appropriately shaped in any suitable manner. For example, inserts 5 may be shaped by vacuum forming, injection molding, or the like in different embodiments of this invention. Again, example methods of forming (i.e., shaping) inserts 5 are discussed in U.S. Pat. No. 6,319,438. Inserts 5 may be shaped similar to a window in certain example embodiments. Thus, in certain instances, inserts 5 may be substantially planar in shape (i.e., planar with small curvatures possible). In this respect, insert 5 may be referred to as a colored panel in certain example embodiments of this invention.

Figure 4:
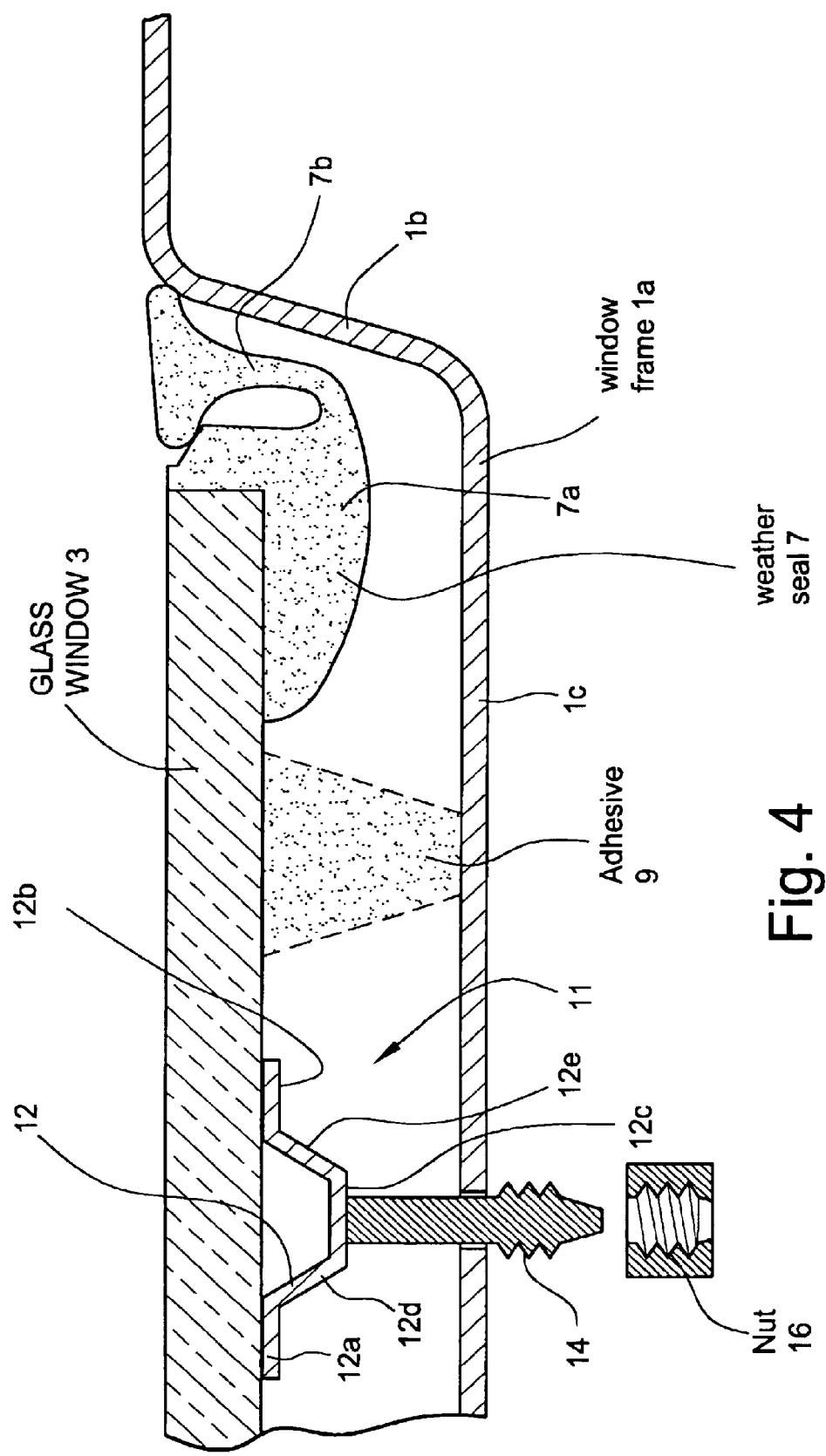
FIG. 4 is a cross sectional view illustrating how a glass window is attached to a window frame opening according to an example embodiment of this invention.

FIG. 4 is a cross sectional view illustrating, for purposes of example and without limitation, an example of how a glass window 3 may be mounted to vehicle window frame 1a in certain example embodiments of this invention. A polymer based weather sealing member 7, which includes a base portion 7a and a flexible lip portion 7b, is adhered to a peripheral area of the window 3 so as to fit between the window and an angled portion 1b of the window frame 1a. Polymer based weather seal 7 may be formed by extrusion, reaction injection molding (RIM), or any other suitable method. A purpose of weather seal 7 is to reduce the amount of water which makes it way past lip 7b and into the gap between the window 3 and the planar portion of the window frame 1a. Example weather seals 7 may be found in any of U.S. Pat. Nos. 6,487,823, 4,765,673, or 5,154,028, all of which are hereby incorporated herein by reference. Adhesive 9 may also be provided in order to help bond window 3 to metal window frame 1a.

Still referring to FIG. 4, fixed attachment member 11 is mounted to a major surface of window 3. Attachment member 11 includes a base portion 12 and stud 14 including male threads thereon. Attachment member 11 may be metallic, or of any other suitable material in different embodiments. Base portion 12 is mounted to window 3 by adhesive or the like, and includes foot portions 12a and 12b which are connected to plateau portion 12c by angled portions 12d, 12e. Threaded linear stud 14 is mounted on plateau portion 12c of base portion 12. While base portion 12 is mounted to window 3, stud 14 is adapted to extend through an aperture in the planar flange portion 1c of window frame 1a as shown in FIG. 4. Female threaded nut 16 engages a portion of stud 14 which extends through the aperture in the window frame 1a in order to secure the attachment member 11 and thus the window 3 to the window frame. It is noted that the attachment member 11 as illustrated in FIG. 4 is provided for purposes of example only, and other types of fixed attachment members may instead be used. Moreover, it is noted that attachment member 11 may be adhered directly to the glass of window 3 in certain embodiments, while in other embodiments the attachment member may be adhered to the window 3 via at least one primer layer (not shown). The system of FIG. 4 is for purposes of example only, as windows may be attached to window frames in a variety of other manners. For example, the stud 14 may be encapsulated in a polymer inclusive member (not shown) in certain example embodiments, and seal 7 may or may not exist. In such embodiments a butyl bead (not shown) may be provided proximate the encapsulated stud for weather sealing purposes.

FIGS. 5(a) and 5(b) are different perspective views illustrating the fixed attachment member 11 used in FIG. 4 to attach the window 3 to vehicle window frame 1a in a rigid manner. FIG. 5(a) illustrates the attachment member 11 from a top perspective, whereas FIG. 5(b) illustrates member 11 from a bottom perspective. Channels 15 formed in the bottom sides of foot portions 12a and 12b may be used to receive adhesive for adhering the member 11 to the window 3. Angled portions 12d, 12e may form an angle θ of from about 20 to 75 degrees with the surface of window 3 on which the member 11 is mounted. Ridge/indentation members 16 may be formed in the metal members 11 in order to structurally stabilize the angle between the angled portions 12d, 12e and foot portions 12a, 12b.

FIGS. 4–5 above illustrate structure for rigidly attaching windows 3 to window frames 1a according to example embodiments of this invention. Turning now to slidably attaching opaque colored inserts 5 to window frames 1a, FIGS. 6 and 7 are referred to.

FIGS. 6 and 7 are perspective views of different opaque colored polymer based inserts 5 according to example embodiments of this invention. The inserts 5 of FIGS. 6 and 7 are similar in that they are each opaque colored polymer based inserts; however they differ in that they have different attachment members mounted thereon.

In FIG. 6, insert 5 has mounted thereon an array of spring biased clip attachment members 20, and also a pair of stud inclusive attachment members. The stud inclusive attachment members in FIG. 6 may either comprise a non-slidable or fixed stud supporting attachment member 11 (see discussion above, and FIGS. 4–5) or a slidable stud supporting attachment member 22 (see discussion below, and FIGS. 11–14) in different embodiments of this invention. In the embodiment of FIG. 7, insert 5 has mounted thereon only one spring biased clip attachment member 20 (none may be provided in certain embodiments), and an array of slidable stud supporting attachment members 22 (see discussion below, and FIGS. 11–14).

Figure 8B:
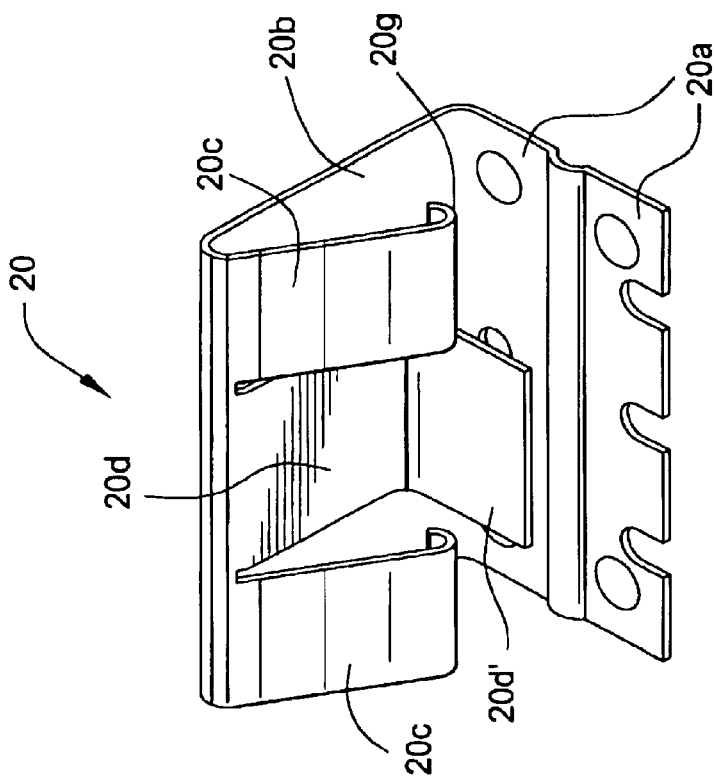
FIGS. 8(a) and 8(b) are perspective views of a spring biased clip attachment member from FIGS. 6–7 which may be used in attaching an opaque colored polymer based insert to a window frame according to an example embodiment of this invention.
Figure 8A:
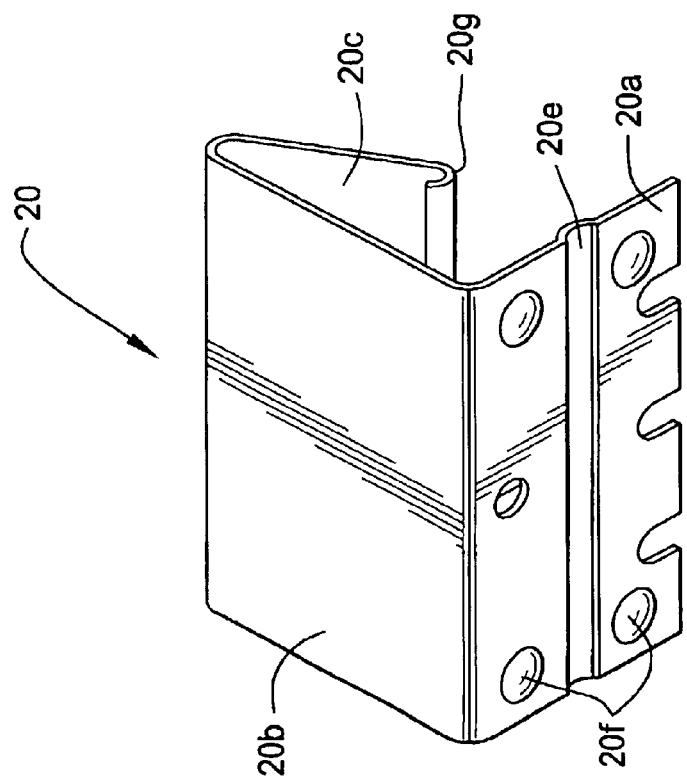
Figure 9:
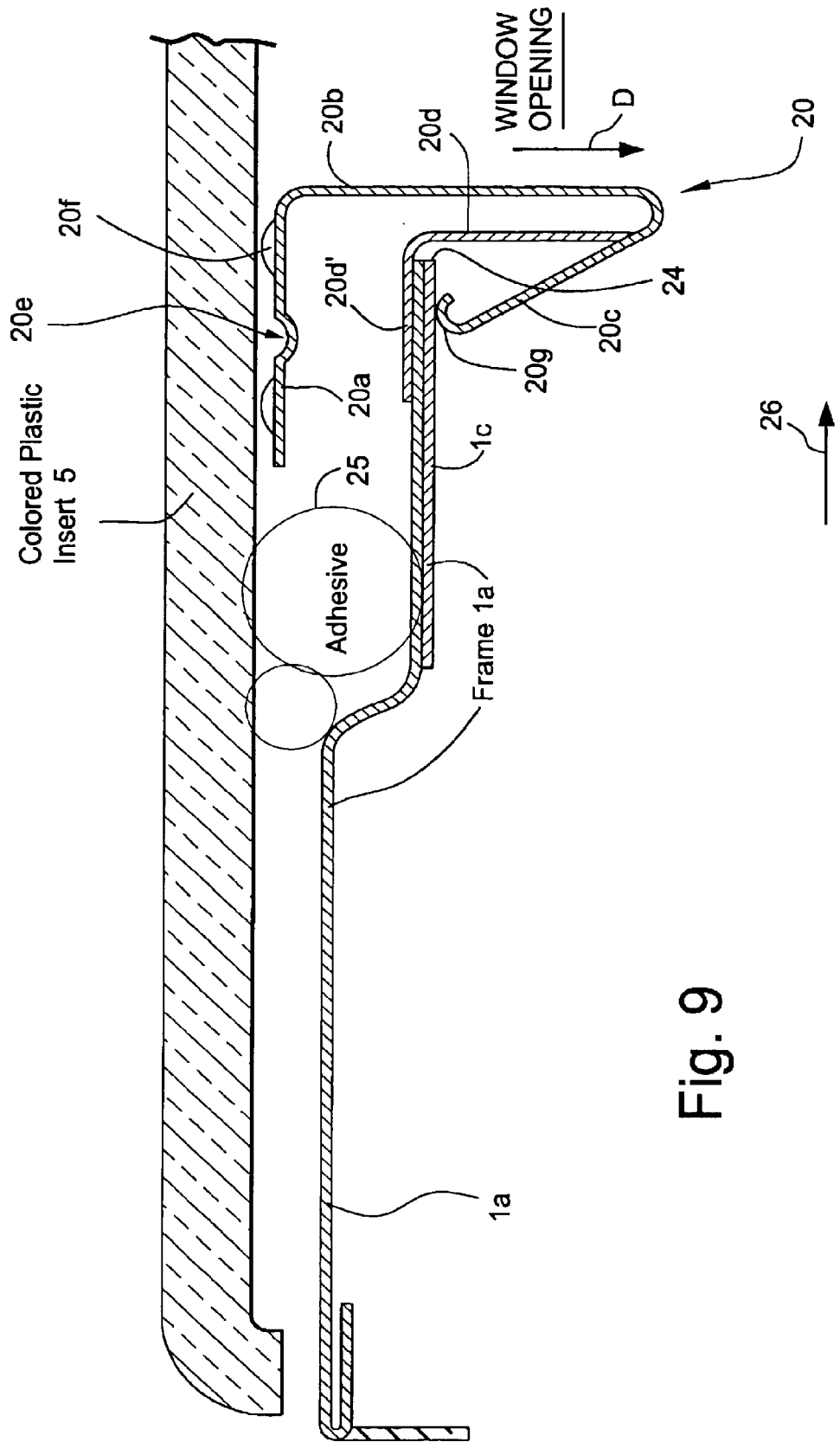
FIG. 9 is a cross sectional view illustrating one of the spring biased clip attachment members of FIG. 8 being used in attaching an opaque colored polymer based insert to a metal window frame according to an example embodiment of this invention.
Figure 10:
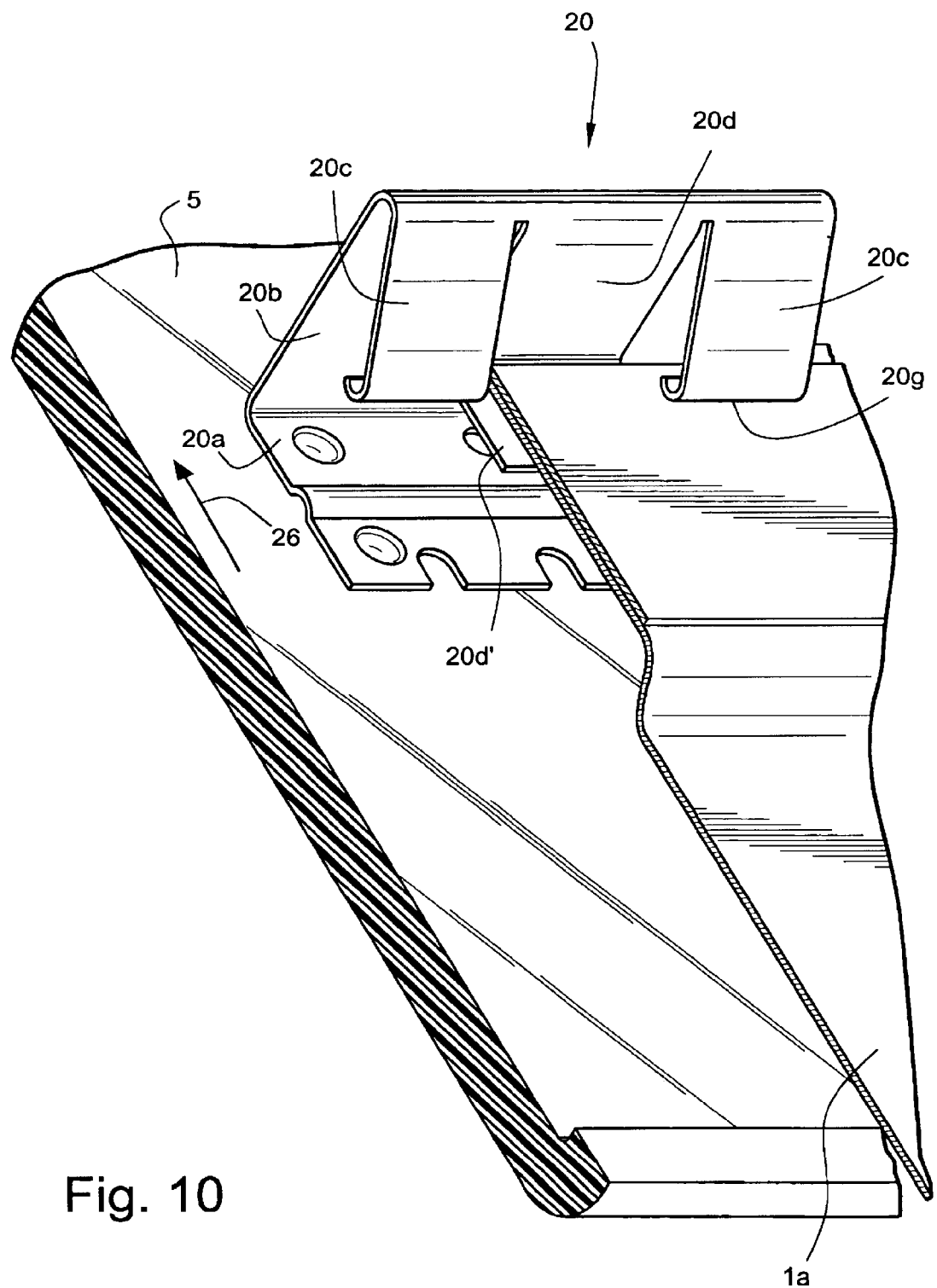
FIG. 10 is a partial cut-away cross sectional view illustrating one of the spring biased clip attachment members of FIGS. 8–9 being used in attaching an opaque colored polymer based insert to a metal window frame according to an example embodiment of this invention (part of the metal window frame is cut away in FIG. 10 for purposes of illustration).

Referring to FIGS. 8–10, it will now be explained how spring biased clip attachment members 20 operate to enable a colored insert 5 to be attached to a vehicle window frame 1a, according to either the FIG. 6 embodiment or the FIG. 7 embodiment. As shown in FIG. 8, an example spring biased clip attachment member 20 includes a base portion 20a, a vertical portion 20b that forms an angle of from about 45 to 135 degrees (more preferably about 90 degrees) with base portion 20a, spring-biased angled portions 20c which extend from a distal end of vertical portion 20b and which define an angle of from about 10 to 60 degrees (more preferably from about 20 to 40 degrees) with vertical portion 20b, and an approximately L-shaped support member which includes a planar portion 20d that is approximately parallel to vertical portion 20b, and which also includes a base support portion 20d' which extends from and forms an angle of approximately 90 degrees (i.e., from 80 to 100 degrees) with an end of planar portion 20d. Spring biased clip attachment members 20 may be made of spring biased steel (e.g., 1.5 mm thick) or any other suitable material in different embodiments of this invention. Base portion 20a includes at least one channel 20e defined therein, which channel may or may not receive an adhesive adapted to adhere the attachment member 20 to the insert 5 in certain example embodiments. Dimples 20f may also be defined on the base portion 20a in certain example embodiments of this invention, where such dimples are used to support the member 20 on insert 5. In other embodiments, the member 20 is attached to the insert by way of screws or the like which may extend through aperture(s) defined in base portion 20a.

As best shown in FIGS. 9–10, in order to mount insert 5 on a vehicle window frame 1a using a spring biased clip attachment member 20, the member 20 is first attached to the insert 5 via its base portion 20a by way of adhesive, fasteners, and/or the like. The insert along with spring biased clip attachment member(s) 20 is/are then inserted into the window opening in direction D as shown in FIG. 9. As an attachment member 20 is inserted into the opening defined by the window frame 1a in direction D, the spring biased angled portions 20c slide past end 24 of the window frame 1a in a contacting manner. As end 24 of the window frame 1a contacts the angled portions 20c during the insertion process, this contact causes the curved distal end 20g of each spring biased angled portion 20c to flex toward vertical portion 20b thereby enabling the angled portions 20c to pass by end 24.

Once the attachment member 20 has been inserted far enough into the window opening so that the ends 20g of the spring biased angled portions 20c have passed by end 24 of the window frame 1a, then spring biasing causes the angled portions 20c to spring back into their natural positions shown in FIGS. 8–10. Once the angled portions 20c have sprung back into their FIGS. 8–10 positions, it can be seen in FIGS. 9–10 that flange portion 1c of window frame 1a becomes sandwiched between the curved distal ends 20g of the spring biased angled portions 20c and a surface of base support portion 20d' of the L-shaped support member. In this position, shown in FIGS. 9–10, the flange portion 1c of the window frame 1a may be in abutting or contacting relation with at least one of a) distal ends 20g of the angled portions, and b) a surface of base support portion 20d'. Flexible adhesive 25 may also be used to adhere the insert 5 to the window frame 1a in certain embodiments.

Spring biased clip attachment members 20 are designed so as to take into account thermal expansion/contraction of the insert 5 relative to the metal window frame 1a. In particular, attachment members 20 are designed so as to permit the insert 5 to which it/they are attached to slide in at least one direction relative to the window frame 1a. It can be seen in FIG. 9 that distal ends 20g prevent the attachment member 20 and thus the insert 5 from being pulled directly out of the window opening due to the abutment of ends 20g against flange 1c. Moreover, base support portion 20d' prevents the member 20 and thus the insert 5 from moving further into the window opening in direction D due to the abutment of support portion 20d' against frame flange 1c. However, there is nothing in the FIGS. 9–10 assembly which prevents the attachment member 20 from sliding in direction 26 relative to frame 1a. Moreover, sliding movement of the attachment member 20 in a direction opposite to 26 relative to frame 1a is also possible, but will ultimately be stopped when planar portion 20d comes into contact with end 24 of frame flange 1c. It will be recognized that by positioning a plurality of attachment members 20 on an insert in different orientations (e.g., facing approximately opposite directions) as shown in FIG. 6 for example, excessive movement of a member 20 in direction 26 which could cause detachment can be prevented.

It is thus possible for the attachment member 20 (and the insert 5 on which it is mounted) to slide relative to the metal frame 1a, without causing the attachment member 20 to fall off or become detached (i.e., the insert 5 stays attached to frame 1a via member(s) 20 during such movement as shown in FIGS. 9–10). Thus, as the insert 5 expands and/or contracts relative to frame 1a due to changes in temperature, attachment member(s) 20 allow the insert 5 to slide in one or more directions with respect to the frame 1a so that thermal expansion/contraction does not cause attachment failure. As a result, thermal expansion/contraction of the insert relative to the frame 1a has been taken into account.

It has been explained above how attachment members 11 (non-sliding stud supporting) and 20 (spring biased clip which allows sliding movement) function in enabling attachment of a window and/or insert to a frame 1a. We now turn to a description of how slidable stud supporting attachment members 22 function according to example embodiments of this invention. As mentioned above, in certain embodiments of this invention, spring biased clip attachment members 20 are mounted on an insert (with no attachment members 22), while in other embodiments of this invention slidable stud supporting attachment members 22 are mounted on an insert (with no attachment members 20), and in other embodiments of this invention one or more of attachment members 20 and/or 22 may be provided on an insert (with or without other types of attachment members such as fixed stud support members 11). Spring biased clip attachment members 20 may or may not be used on an insert 5 in combination with slidable stud supporting attachment members 22 (and vice versa) in different embodiments of this invention.

Figure 11:
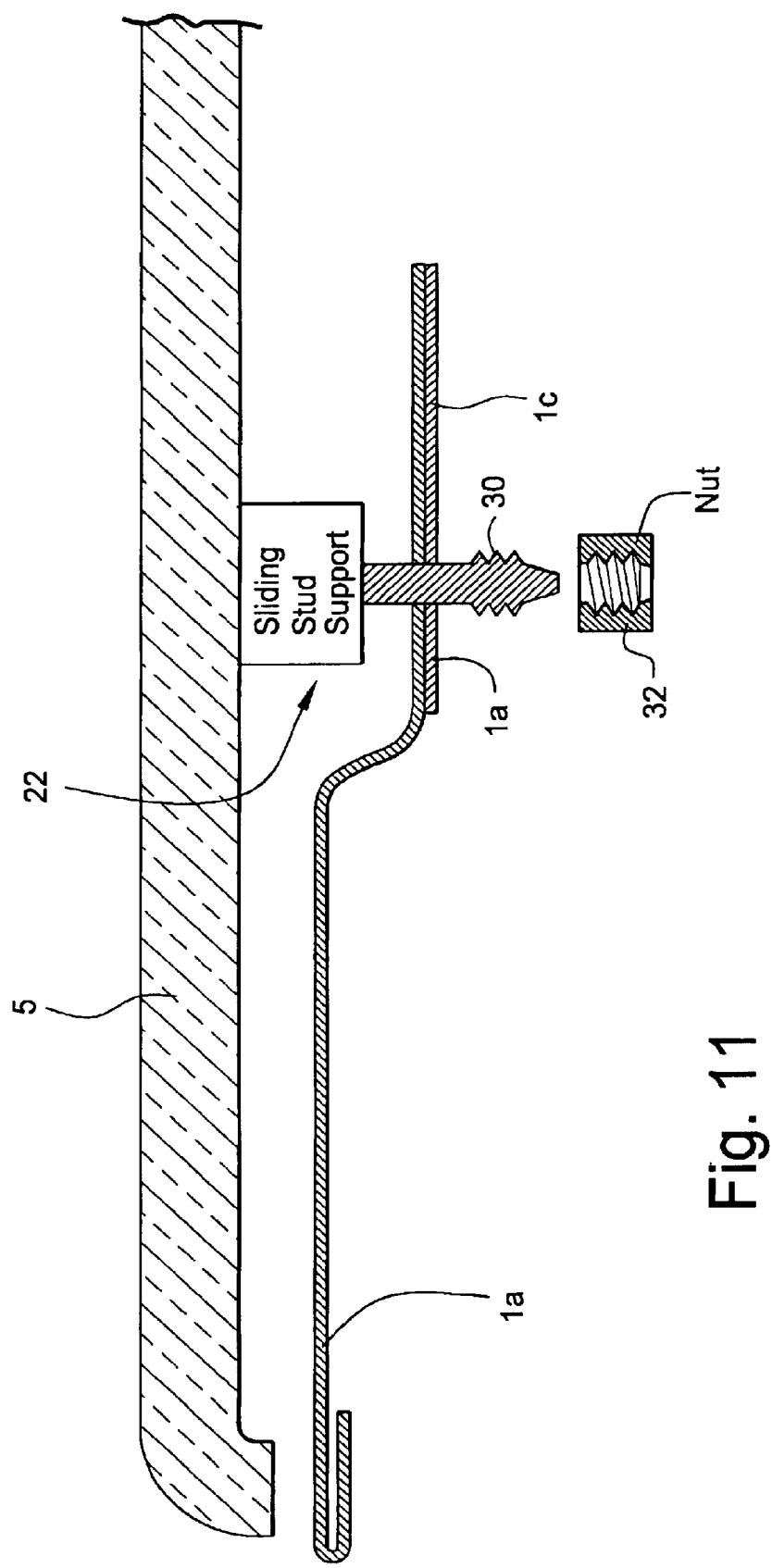
FIG. 11 is a cross sectional view illustrating one of the slidable stud supporting attachment members of FIGS. 6–7 being used in attaching an opaque colored polymer based insert to a metal window frame according to an example embodiment of this invention.

Referring to FIGS. 11–14, it will now be explained how slidable stud supporting attachment members 22 operate to enable a colored insert 5 to be attached to a vehicle window frame 1a, according to either the FIG. 6 embodiment or the FIG. 7 embodiment of this invention for example. FIG. 11 is a cross sectional view generally illustrating (not in detail) a slidable stud supporting attachment member 22 mounted on a surface of insert 5 for attaching the insert to metal window frame 1a. It can be seen that the threaded stud 30 of the attachment member 22 extends through a corresponding aperture defined in flange portion 1c of the metal window frame 1a. A portion of stud 30 which extends through flange 1c is threadedly engaged by female-threaded nut 32, so that when the nut 32 is secured to stud 30 against flange 1c the attachment member 22 and thus the insert 5 are securely fastened to the window frame 1a. Studs 30, in addition to being used to attach the insert and member 22 to the window frame 1a, may also be used as a base for securing other vehicle components (not shown) at the vehicle interior in certain example embodiments of this invention.

Figure 12A:
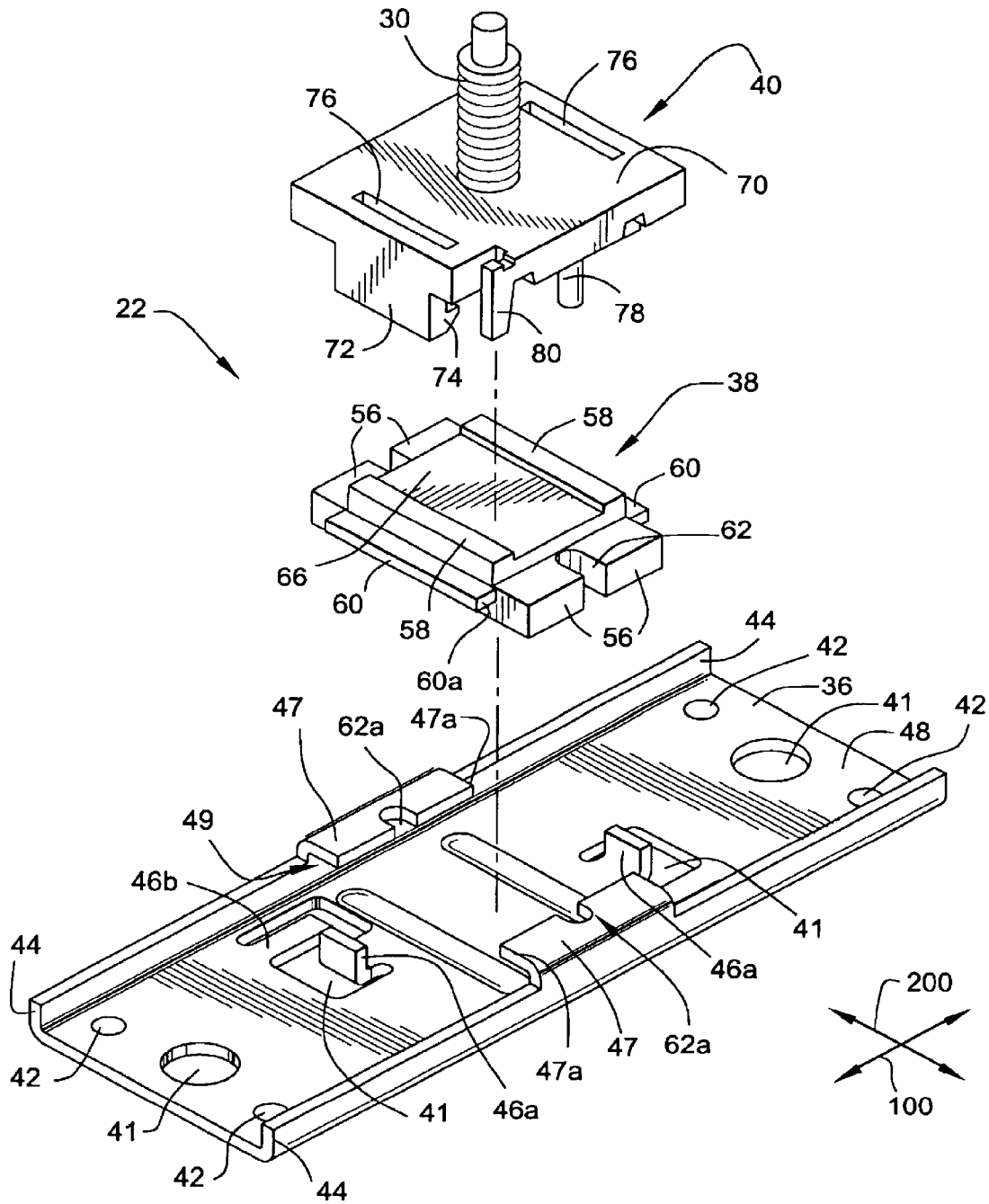
FIG. 12(a) is an exploded perspective view of an example slidable stud supporting attachment member of FIGS. 6–7 and 11.
Figure 12B:
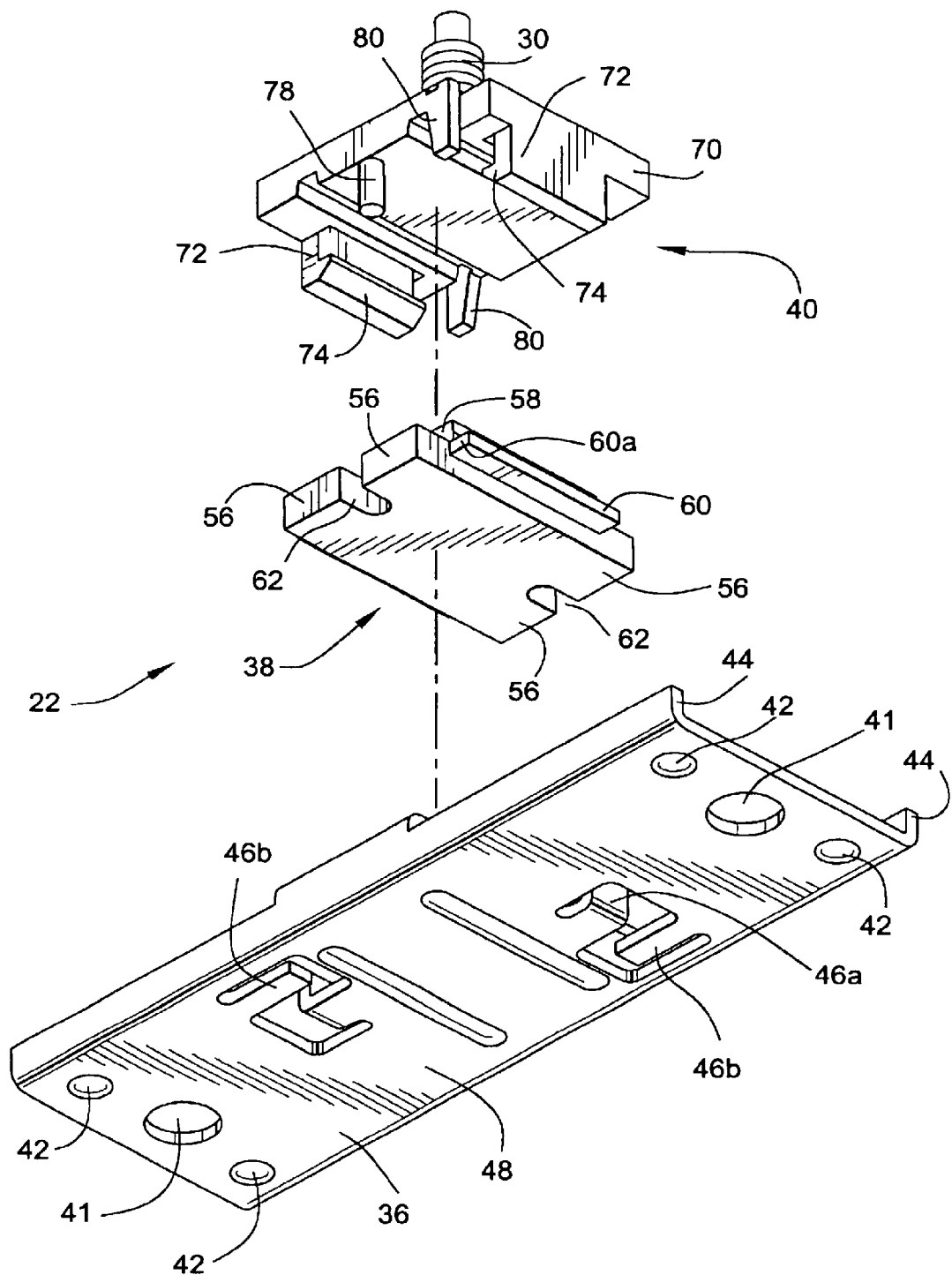
FIG. 12(b) is another exploded perspective view of an example slidable stud supporting attachment member of FIGS. 6–7 and 11–12(a).

FIGS. 12(a) and 12(b) are perspective exploded views of an example slidable stud supporting attachment member 22, which provide more detail than FIG. 11. Referring to FIGS. 12(a) and 12(b), the attachment member 22 includes base support bracket 36 adapted to be secured (e.g., via adhesive or the like) to a major surface of the insert 5, slider member 38 adapted to be slidably attached to base support bracket 36, and stud mount member 40 adapted to be slidably attached to slider member 38.

Base support bracket 36 may be secured to the major surface of insert 5 via any suitable means, including but not limited to adhesive (e.g., urethane based adhesive) or fastener(s). Base support bracket 36 is made of metal in certain example embodiments of this invention, although other materials may instead be used. Base support bracket 36 includes substantially planar base portion 48 which includes apertures 41 and dimples 42 which extend toward the insert defined therein, upturned side portions 44 which define an angle of from about 70 to 110 degrees (preferably about 90 degrees) with base portion 48, deformable tabs 46a and 46b defined in the base portion 48, and overhanging members 47 which at least partially define respective channels 49 under the overhang between members 47 and base portion 48.

As will be explained below, one or both of tabs 46a and/or 46b may be deformed from a flat or planar position to a bent position in order to define a desired range of movement of slider 38. For example, FIGS. 12–14 illustrate tabs 46a, but not tabs 46b, in an upwardly bent position for defining a desired range of movement of slider 38. A different range of slider movement may be defined if one or both of tabs 46b (instead of 46a) is deformed or bent upwardly in a similar manner.

Slider member 38 includes side or end portions 56 for sliding engagement in respective channels 49 defined under the overhanging members 57, elongated linear upper rails 58 upon which stud mount member 40 is adapted to slide, and protrusions 60 which extend from respective opposing sides of slider 38 for engagement with stud mount member 40. Moreover, a cut-out or aperture 62 (which corresponds to a cut-out or aperture 62a in an overhanging member 47) is defined in each of opposing ends or sides of slider 38. A generally planar area 66 is defined between rails 58, at an elevation below that of the rails. Slider member 38 may be made of plastic (e.g., acetal), or any other suitable material in different embodiments of this invention.

Stud mount member 40 supports male threaded stud 30, and includes main body portion 70 which supports stud 30, protrusions 72 which extend from main body 70 and include barbs 74 proximate end portions thereof for slidably engaging respective protrusions 60 of the slider, elongated apertures 76 located over protrusions 72 and/or barbs 74, sacrificial breakaway pin(s) 78 adapted to be inserted into apertures 62 and 62a of the slider 38 and support bracket 36, respectively, and sacrificial protrusion(s) (e.g., tabs) 80. In certain embodiments of this invention, only one sacrificial pin 78 is provided as shown in the instant drawings; however, in other embodiments of this invention a pair of sacrificial pins 78 may be provided where each pin fits into a corresponding aperture pair 62, 62a on opposite sides of the slider/bracket.

As will be explained below, sacrificial member(s) 78 and/or 80 are adapted to break off upon significant thermal expansion and/or contraction of the insert 5 relative to the frame 1a to which the insert is mounted. The breaking off of the sacrificial member(s) 78 and/or 80 enables the stud 30 to thereafter slide to a significant extent (e.g., at least 0.5 mm, more preferably at least 1 mm, most preferably at least 2 mm, even more preferably at least 4 mm, and most preferably at least 5 mm) in at least one direction relative to base support bracket 36 and thus insert 5 to which it is mounted, thereby enabling the insert to slide in at least one direction relative to the metal frame 1a to which it is mounted so as to prevent or reduce system failures due to temperature changes.

Referring to FIGS. 11–14, it will now be described how a slidable stud supporting attachment member 22 is installed and used to enable an insert 5 to be slidably mounted to a vehicle frame member 1a. Initially, the base support bracket 36, slider 38 and stud mount member 40 are assembled to form the slidable stud supporting member 22. In this respect, with one or more of deformable tabs 46a and 46b in flat position substantially coplanar with base portion 48, slider 38 is positioned on a flat surface of base support bracket 36 (e.g., over an aperture 41). Then, the slider 38 is slid toward the center of the support bracket 36 so that the side or end portions 56 thereof slide into respective channels 49 defined under overhanging members 47. Once the slider 38 has slid into a central position on the support bracket 36, one or more tabs 46a and/or 46b may be bent upwardly in order to retain slider 38 in a position(s) generally over the central area of the bracket 36. At this point, the slider 38 is permitted to slide in direction 100 as portions 56 of the slider 38 can slide in channels 79. However, once two tabs 46a and/or 46b on opposite sides of the slider 38 have been bent upwardly, these tabs limit sliding movement in direction 100 to a desired range of movement (i.e., sliding of the slider 38 is still permitted in direction 100, but its extent is limited by the tabs 46a and/or 46b).

The stud mount member 40 is pressed downwardly toward and onto slider 38 so that: (a) pin(s) 78 is inserted into aperture 62 in slider 38 and also into a corresponding aperture 62a defined in base support bracket 36; and (b) barbs 74 of protrusions 72 flex outwardly as the stud mount member 40 is pressed onto slider 38 and ultimately snap into an engaging position after sufficient pressing so that barbs 74 engage with an under-side of protrusions 60 of the slider thereby securing the stud mount member 40 to the slider 38 in a sliding relation. Barbs 74 engage the undersides of protrusions 60 so that the stud mount member 40 can slide on rails 58 of the slider 38 as the barbs 48 slide along the respective undersides of protrusions 60, thereby allowing the stud mount member 40 to slide relative to slider 38 but preventing the stud mount member from being lifted straight up off of the slider. The presence of sacrificial pin(s) 78 in apertures 62 and 62a of both the slider 38 and support bracket 36 enables the three components (36, 38, 40) to be initially aligned with one another in a desired position so long as pin(s) 78 is intact.

After components 36, 38 and 40 have been assembled as discussed above to form a slidable stud supporting attachment member 22, the attachment member 22 is mounted on a major surface of colored insert 5 in any suitable manner (e.g., via adhesive). At this point, when sacrificial members 78 and 80 are intact, little or no sliding of stud mount member 40 and/or slider 38 relative to support bracket 36 (and thus relative to the insert 5) is possible. When sacrificial members (e.g., pins) 78 are intact, they are present in apertures 62 and 62a defined in the slider 38 and bracket 36, respectively, thereby preventing significant sliding of the stud mount member 40 relative to slider 38, bracket 36 and insert 5 in directions 100 and 200. Moreover, when the pair of sacrificial members 80 are intact, their potential abutment against an end 47a of an adjacent overhanging member 47 prevents significant sliding of the stud mount member 40 relative to slider 38, bracket 36 and/or insert 5 in direction 100. Furthermore, when sacrificial members 80 (e.g., tabs) are intact, their potential abutment against an end 60a of an adjacent protrusion 60 prevents significant sliding of the stud mount member 40 relative to slider 38, bracket 36 and/or insert 5 in direction 200. Direction 100 may be substantially perpendicular (but substantially coplanar) to direction 200 in certain embodiments of this invention. It is also noted that "directions" 100 and 200 as defined herein each include both forward and reverse movement along a given axis (i.e., directions 100 and 200 each have two arrows, one at each end). After one or more members 22 have been mounted on an insert 5, the insert is attached to a metal frame 1a as explained above via stud 30 (e.g., see FIG. 11).

Figure 12C:
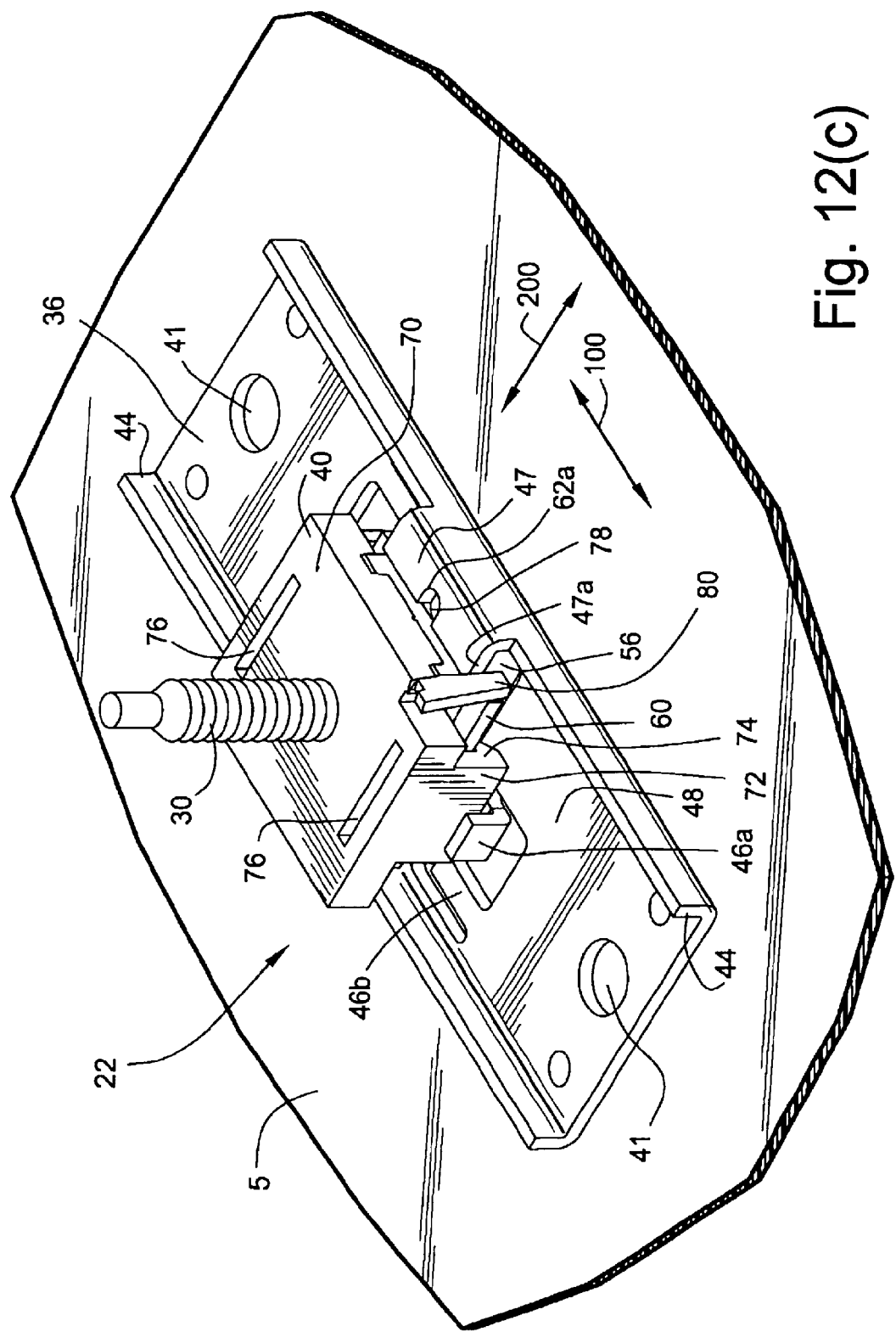
FIG. 12(c) is a perspective view illustrating the slidable stud supporting attachment member of FIGS. 6–7, 11, 12(a) and 12(b) mounted on an opaque colored polymer based insert.
Figure 13A:
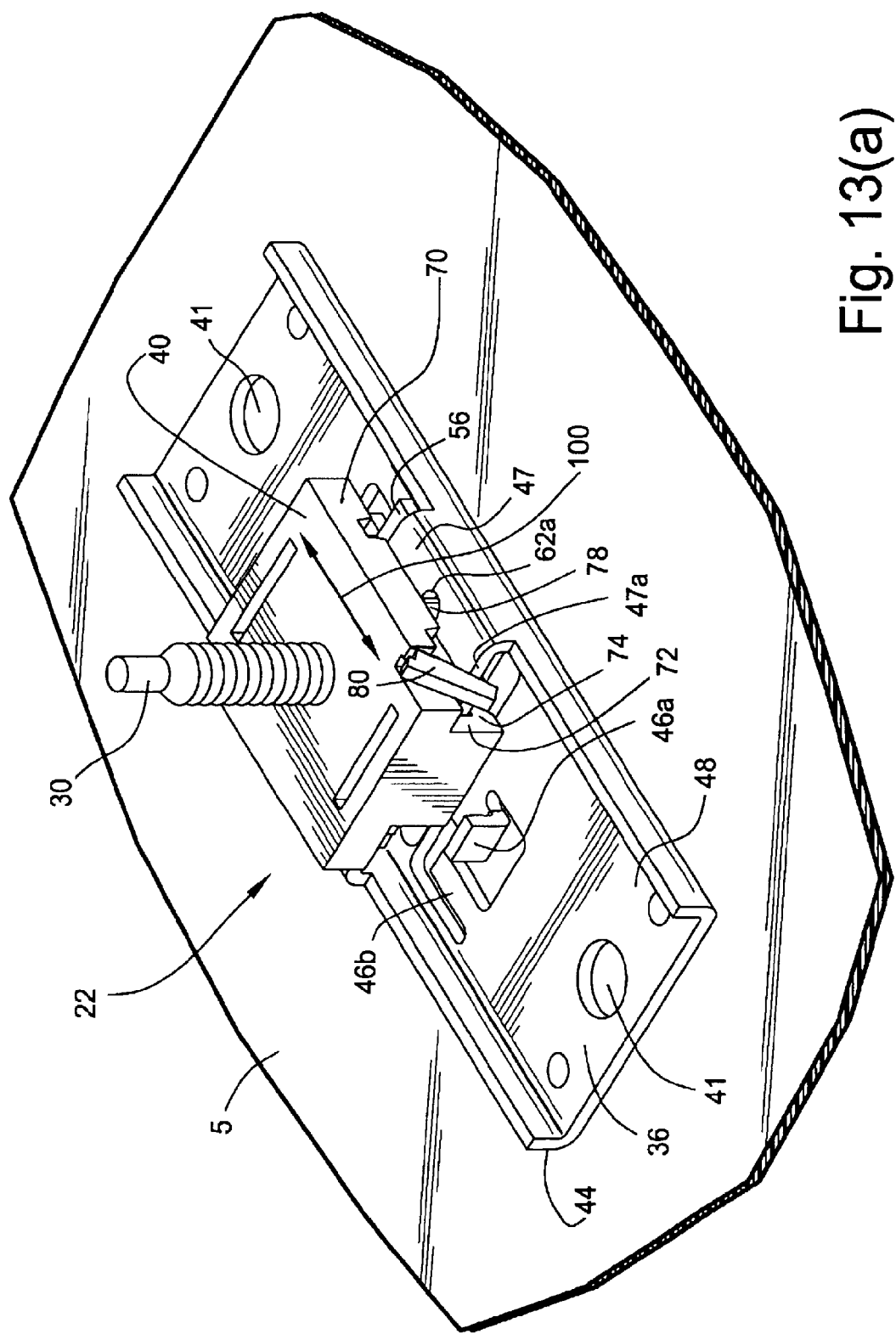
FIGS. 13(a) and 13(b) are perspective views illustrating at least one sacrificial member (e.g., tab or the like) of the slidable stud supporting attachment member of FIGS. 6–7 and 11–12 breaking off upon movement of the stud in a first linear direction (e.g., due to thermal expansion and/or contraction of the insert) so as to thereafter allow sliding movement of the stud in at least the first direction with respect to the insert.

Thus, as shown in FIG. 12(c), when initially mounted on an insert 5, the stud 30 of a slidable stud supporting attachment member 22 is capable of sliding little if any relative to the insert 5. In certain example embodiments, when initially mounted, stud 30 can only slide less than 3 mm in one or both directions 100, 200 (more preferably less than 2 mm, and even more preferably less than 1 mm). This limitation upon sliding movement is caused by the presence of sacrificial members 78 and 80 as explained above.

However, upon a significant temperature increase for example, polymer based insert 5 may expand to an extent much greater than metal frame 1a. Such expansion of insert 5 may cause the insert to effectively move in any suitable direction (e.g., direction 100 and/or 200 to some extent vector-wise) relative to frame 1a. When such movement/sliding of the insert 5 occurs, this causes the stud 30 affixed to the frame 1a to slide relative to the bracket 36 which is mounted to the insert. As best shown in FIG. 13(a), when the insert 5 and frame 1a slide relative to one another (only one of them need slide for this "relative" sliding to occur) in direction 100, sufficient sliding force may be provided to cause sacrificial tab 80 to break off as the tab hits end 47a of the overhanging member 47 (the other tab 80 breaks off in a similar manner upon sliding in an opposite manner). Moreover, sufficient force may also be provided in such an instance to cause sacrificial pin 78 to break off as it hits a side of aperture 62 and/or 62a. As shown in FIG. 13(a), once the illustrated sacrificial tab 80 and the illustrated sacrificial pin 78 break off due to this sliding force caused by thermal expansion/contraction, the stud mount member 40 (and thus stud 30 which is mounted to frame 1a) is free to slide in direction 100 relative to support bracket 36 (and thus relative to the insert 5 to which the bracket is mounted).

Figure 13B:
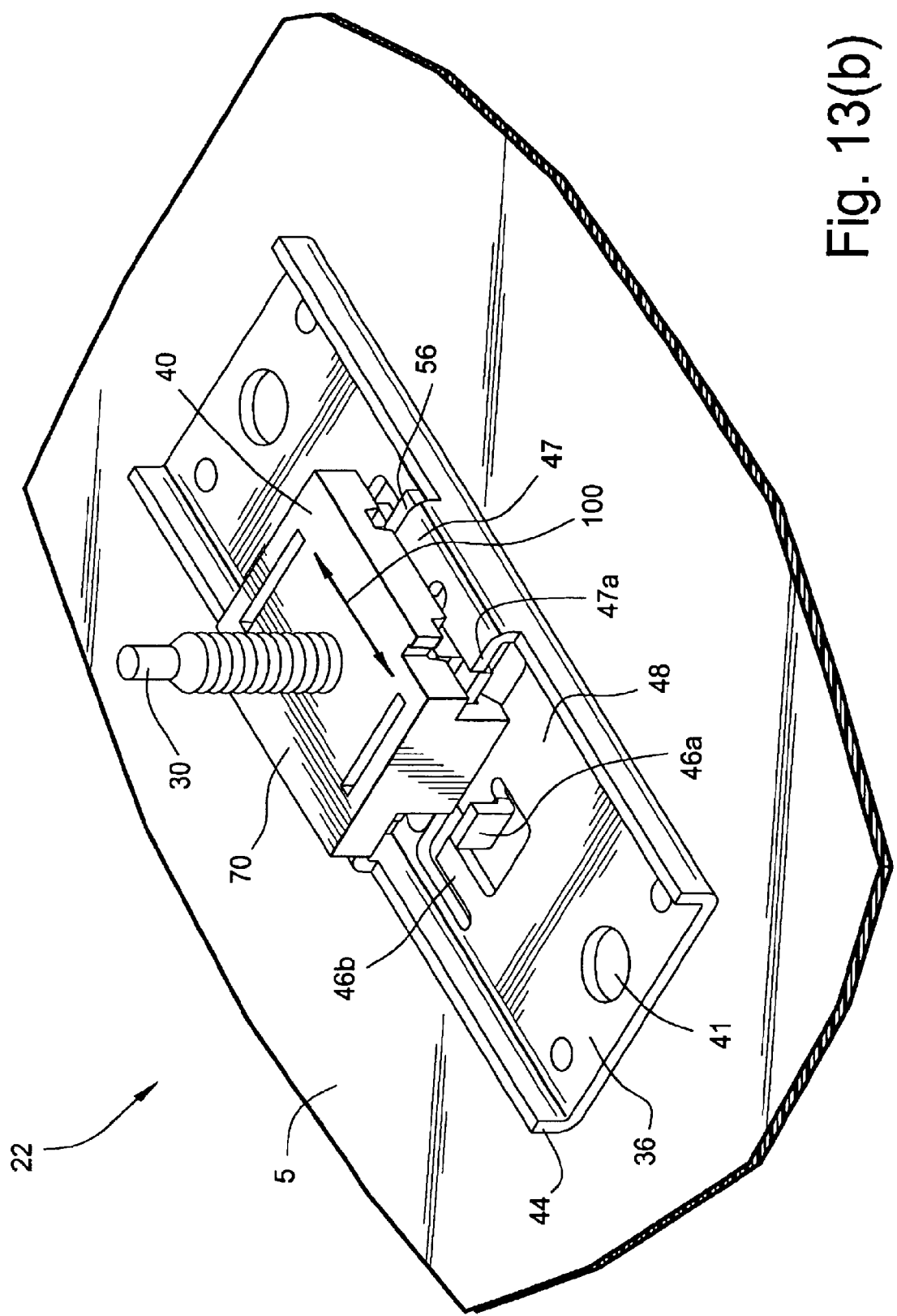

FIG. 13(a) illustrates the movement which causes sacrificial members 78 and 80 to break off, whereas FIG. 13(b) illustrates the attachment member after 78 and 80 have broken off and more free sliding movement in direction 100 is possible. As explained previously, this sliding in direction 100 is effected as side or end portions 56 of the slider 38 slide in respective channels 49 defined by the bracket 36. While significant sliding movement of the stud 30 relative to the bracket 36 and insert 5 is thus enabled in direction 100, the positions of bent-up tabs 46a and/or 46b may limit the range of sliding in direction 100 to a desired extent so as to prevent the entire slider 38 from exiting channels 49 and becoming detached from support bracket 36. It will be appreciated that in certain example embodiments of this invention, the sliding of insert 5 and/or parts of the attachment member 22 discussed above generally takes place in a plane in which directions 100 and 200 extend, wherein this plane is substantially parallel (i.e., parallel plus/minus about 10 degrees) to planes defined by (a) a base portion 48 of bracket 36, and/or (b) a part of the frame member such as flange 1c.

Figure 14A:
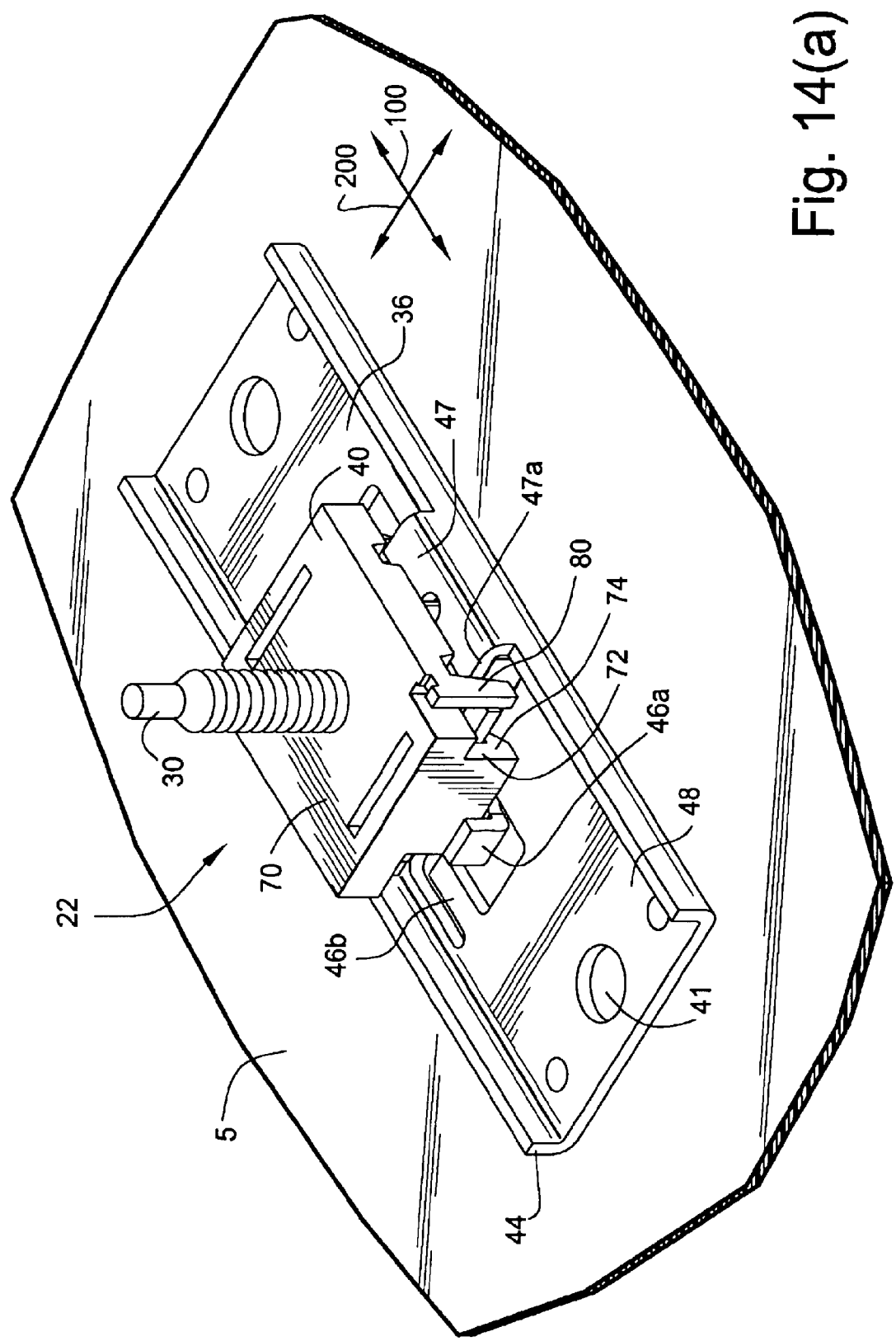
FIGS. 14(a) and 14(b) are perspective views illustrating the sacrificial member of FIG. 13 of the slidable stud supporting attachment member of FIGS. 6–7 and 11–12 breaking off upon movement of the stud in a second linear direction (e.g., due to thermal expansion and/or contraction of the insert) so as to thereafter allow sliding movement of the stud in at least the second direction with respect to the insert.
Figure 14B:
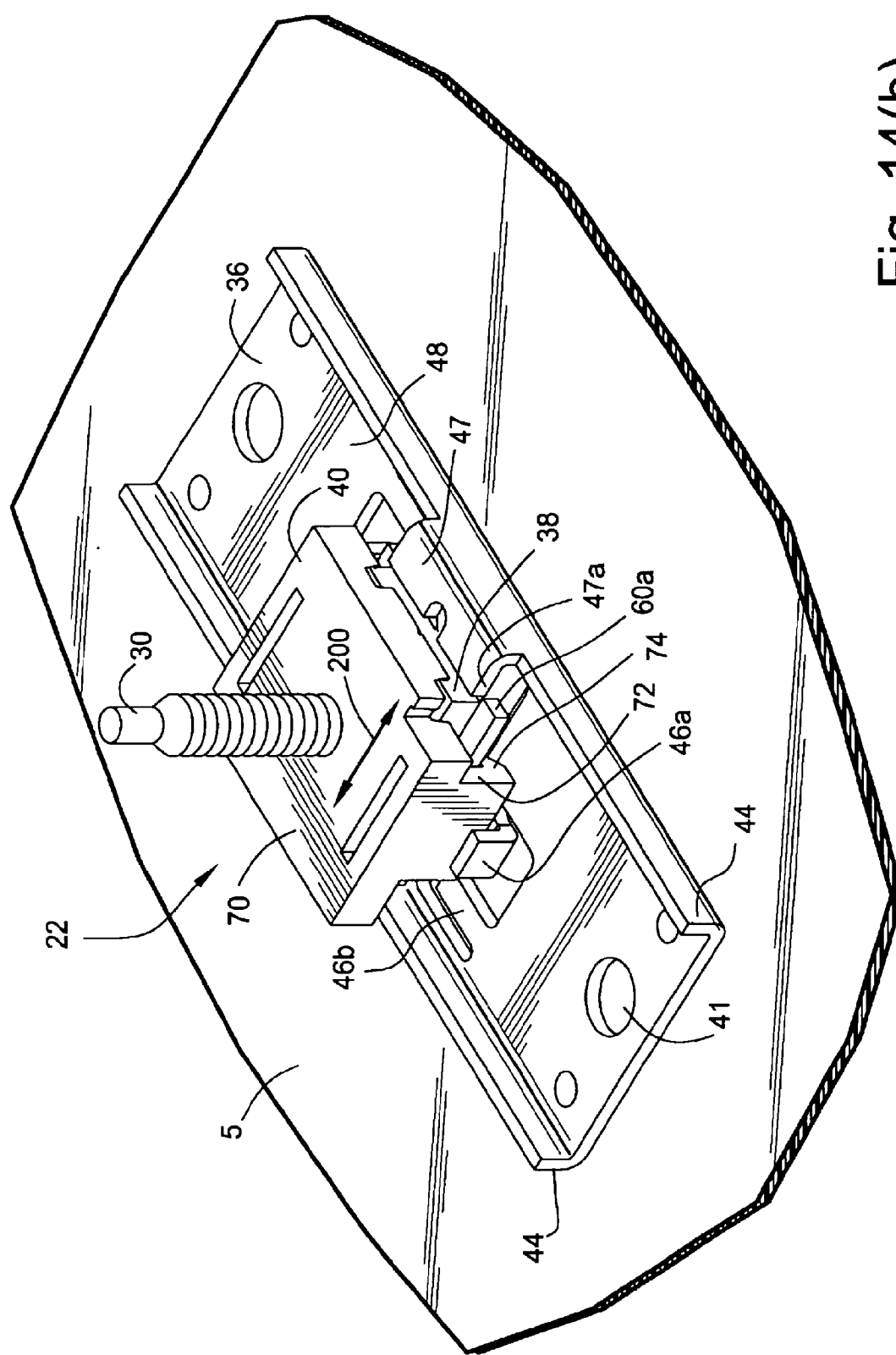

Moreover, as best shown in FIG. 14(a), when the insert 5 and frame 1a slide relative to one another in direction 200, sufficient sliding force may be provided to cause sacrificial tab 80 to break off as the tab hits end 60a of the adjacent protrusion 60 of the slider 38 (note: slider 38 cannot significantly slide in direction 200 due to the presence of overhanging members 47 which prevent such movement). Moreover, sufficient force may also be provided in such an instance to cause sacrificial pin(s) 78 to break off as it/they hit a side of aperture 62. As shown in FIG. 14(a), once the illustrated sacrificial tab 80 and the illustrated sacrificial pin 78 break off due to this sliding force caused by thermal expansion/contraction, the stud mount member 40 (and thus stud 30 which is mounted to frame 1a) is free to slide in direction 200 relative to support bracket 36 (and thus relative to the insert 5 to which the bracket is mounted). As explained previously, this sliding in direction 200 is effected as the stud mount 40 slides on slider rails 58 and barbs 74 engage the undersides of respective protrusions 60. While significant sliding movement of the stud 30 relative to the bracket 36 and insert 5 is thus enabled in direction 200, sliding of the stud in direction 200 is ultimately limited in direction 200 when ends of protrusions 72 hit and are stopped by respective upturned side portions 44 of base support bracket 36, thereby preventing the stud mount 40 from becoming detached from slider 38.

Thus, it can be seen that when sacrificial members 78 and/or 80 break off due to thermal expansion/contraction of the insert 5, the slidable stud supporting attachment member 22 allows the stud 30 to slide relative to base support bracket 36 in both the x and y directions (i.e., in both directions 100 and 200). In other words, the insert 5 (to which the bracket 36 is mounted) is permitted to slide in the x and y directions relative to metal frame 1a. Accordingly, thermal expansion of the insert is taken into account and will typically not cause attachment failure.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A vehicle comprising:
   a frame member;
   an opaque colored polymer based insert attached to the frame member via at least one attachment member;
   wherein said attachment member allows the opaque colored polymer based insert to slide in at least one direction relative to the frame member after the insert has been attached to the frame member;
   wherein the attachment member comprises first and second spring biased angled members, and a base support portion which is connected to the spring biased angled members, and wherein a portion of the frame member is slidably sandwiched between: (a) distal ends of the spring biased angled members, and (b) the base support portion; and
   wherein the base support portion is part of an approximately L-shaped support member which is connected to the spring biased angled members.

2. The vehicle of claim 1, wherein the attachment member further comprises a base portion which is secured to a major surface of the opaque colored polymer based insert, and a vertical portion which extends between (i) the base portion, and (ii) the spring biased angled members and the approximately L-shaped support member.

3. A vehicle comprising:
a frame member;
an opaque colored polymer based insert attached to the frame member via at least one attachment member;
wherein said attachment member allows the opaque colored polymer based insert to slide in at least one direction relative to the frame member after the insert has been attached to the frame member; and
wherein the opaque colored polymer based insert is further attached to the frame member by an adhesive.

4. The vehicle of claim 1, wherein a plurality of said attachment members are mounted on a major surface of the insert in different orientations, for attaching the insert to the frame member.

5. A vehicle comprising:
a frame member;
an opaque colored polymer based insert attached to the frame member via at least one attachment member;
wherein said attachment member allows the opaque colored polymer based insert to slide in at least one direction relative to the frame member after the insert has been attached to the frame member; and
wherein said attachment member comprises a base support member including a pair of channels defined therein, a slider adapted to slide in a first direction in said channels of the base support member, and a stud support member which supports an attachment stud to be received by the frame member, wherein the stud support member is adapted to slide on the slider in a second direction which is different than the first direction.

6. The vehicle of claim 5, wherein said attachment member further comprises at least one sacrificial member that is adapted to break off after the insert has been attached to the frame member via the attachment member, wherein the insert is able to slide to a greater extent in the at least one direction relative to the frame member after the sacrificial member has broken off than before the sacrificial member has broken off.

7. The vehicle of claim 6, wherein the sacrificial member comprises a pin and/or tab which is part of the stud support member, and wherein the pin and/or tab is adapted to abut a portion of at least the slider before the pin and/or tab breaks off of the stud support member.

8. The vehicle of claim 6, wherein the slider comprises first and second rails upon which the stud support member slides.

9. The vehicle of claim 6, wherein the stud support member comprises a main body portion comprising a polymer material which supports a metallic threaded stud.

10. A vehicle comprising:
a frame member;
an opaque colored polymer based insert attached to the frame member via at least one attachment member;
wherein said attachment member allows the opaque colored polymer based insert to slide in at least one direction relative to the frame member after the insert has been attached to the frame member; and
wherein said attachment member comprises at least one sacrificial member that is adapted to break off after the insert has been attached to the frame member via the attachment member, wherein the insert is able to slide to a greater extent in the at least one direction relative to the frame member after the sacrificial member has broken off than before the sacrificial member has broken off, and wherein the insert is still slidably to the frame member after the sacrificial member has broken off.

11. The vehicle of claim 1, wherein the attachment member allows the opaque colored polymer based insert to slide in a plane relative to the frame member after the insert has been attached to the frame member, and wherein the plane in which the insert slides in the at least one direction is substantially parallel to a plane defined by at least part of the frame member.

12. A vehicle comprising:
frame means for supporting at least a colored panel;
the colored panel being attached to the frame means via at least one attachment member;
wherein said attachment member includes sliding means for allowing the colored panel to slide in at least one direction relative to the frame means after the colored panel has been attached to the frame means thereby providing a slidable attachment of the colored panel to the frame means;
wherein the sliding means comprises first and second spring biased angled members, and a base support portion which is connected to the spring biased angled members, and wherein a portion of the frame means is slidably sandwiched between: (a) distal ends of the spring biased angled members, and (b) the base support portion; and
wherein the base support portion is part of an approximately L-shaped support member which is connected to the spring biased angled members.

13. A vehicle comprising:
frame means for supporting at least a colored panel;
the colored panel being attached to the frame means via at least one attachment member;
wherein said attachment member includes sliding means for allowing the colored panel to slide in at least one direction relative to the frame means after the colored panel has been attached to the frame means thereby providing a slidable attachment of the colored panel to the frame means; and
wherein the colored panel is further attached to the frame means by an adhesive.

14. The vehicle of claim 12, wherein a plurality of said attachment members are mounted on a major surface of the colored panel in different orientations, for attaching the panel to the frame means.

15. A vehicle comprising:
frame means for supporting at least a colored panel;
the colored panel being attached to the frame means via at least one attachment member,
wherein said attachment member includes sliding means for allowing the colored panel to slide in at least one direction relative to the frame means after the colored panel has been attached to the frame means thereby providing a slidable attachment of the colored panel to the frame means; and
wherein said sliding means comprises a base support member including a pair of channels defined therein, a slider member adapted to slide in a first direction in said channels of the base support member, and a stud support member which supports an attachment stud to be received by the frame means, wherein the stud support member is adapted to slide on the slider in a second direction which is different than the first direction.

16. The vehicle of claim 15, wherein said attachment member comprises at least one sacrificial member that is adapted to break off after the colored panel has been attached to the frame means via the attachment member, wherein the panel is able to slide to a greater extent in the at least one direction relative to the frame means after the sacrificial member has broken off than before the sacrificial member has broken off.

17. The vehicle of claim 16, wherein the sacrificial member comprises a pin and/or tab which is integrally formed with the stud support member, and wherein the pin and/or tab is adapted to abut a portion of at least the slider member before the pin and/or tab breaks off of the stud support member.

18. The vehicle of claim 15, wherein the slider member comprises first and second rails upon which the stud support member slides.

19. The vehicle of claim 15, wherein the stud support member comprises a main body portion comprising a polymer material which supports a metallic threaded stud.

20. A vehicle comprising:
  frame means for supporting at least a colored panel;
  the colored panel being attached to the frame means via at least one attachment member;
  wherein said attachment member includes sliding means for allowing the colored panel to slide in at least one direction relative to the frame means after the colored panel has been attached to the frame means thereby providing a slidable attachment of the colored panel to the frame means; and
  wherein said attachment member comprises at least one sacrificial member that is adapted to break off after the colored panel has been attached to the frame means via the attachment member, wherein the panel is able to slide to a greater extent in the at least one direction relative to the frame means after the sacrificial member has broken off than before the sacrificial member has broken off, and wherein the panel is still slidably attached to the frame means after the sacrificial member has broken off.

21. The vehicle of claim 12, wherein the attachment member allows the colored panel to slide in a plane relative to the frame means after the panel has been attached to the frame means, and wherein the plane in which the panel slides is substantially parallel to a plane defined by at least part of the frame means.

22. An attachment member for attaching a component to a frame member of a vehicle, the attachment member comprising:
  a base support member defining at least one channel, the base support member adapted to be mounted on the component;
  a slider adapted to slide in a first direction of said channel; and
  a stud support member which supports an attachment stud to be received by the frame member of the vehicle, wherein the stud support member is adapted to slide on the slider in a second direction which is different than the first direction to that the attachment member is adapted to allow the component to slide in at least first and second directions relative to the frame member; and
  wherein at least part of the slider is located between the base support member and the stud support member.

23. The attachment member of claim 22, wherein the first and second directions are in a common plane, and are approximately perpendicular to one another.

24. The attachment member of claim 22, wherein said attachment member further comprises at least one sacrificial member means for breaking off after the component has been attached to the frame member via the attachment member so that the component is able to slide to a greater extent in the at least one direction relative to the frame member after the sacrificial member means has broken off than before the sacrificial member means breaks off.

25. The attachment member of claim 24, wherein the sacrificial member means comprises a pin and/or tab which is part of the stud support member, and wherein the pin and/or tab is adapted to abut a portion of at least the slider before the pin and/or tab breaks off of the stud support member.

26. The attachment member of claim 22, wherein the slider comprises first and second rails upon which the stud support member slides.

27. The attachment member of claim 22, wherein the stud support member comprises a main body portion comprising a polymer material which supports a metallic threaded stud to be received in a aperture defined in the frame member of the vehicle.

28. The attachment member of claim 23, wherein said plane is approximately parallel to a base portion of said base support member.

29. An attachment member for attaching a component to a frame member of a vehicle in a manner such that after being attached to the frame member the component is able to slide in at least one direction relative to the frame member, the attachment member comprising:
  a base support member adapted to be mounted on the component; and
  sacrificial means, including at least one sacrificial member, for breaking off after the component has been attached to the frame member via the attachment member, so that the component is able to slide to a greater extent in the at least one direction relative to the frame member after the sacrificial member has broken off than before the sacrificial member breaks off, and wherein the component is still slidably attached to the frame member after the sacrificial member has broken off.

30. An attachment member for attaching a component to a frame member of a vehicle in a manner such that after being attached to the frame member the component is able to slide in at least one direction relative to the frame member, the attachment member comprising:
  a base portion adapted to be mounted on the component;
  first and second spring biased angled members operatively connected to the base portion,
  a support portion connected to the spring biased angled members,
  wherein a portion of the frame member is to be slidably received between: (a) distal ends of the spring biased angled members, and (b) the support portion; and
  wherein the support portion is part of an approximately L-shaped support member which is connected to the spring biased angled members.

31. The attachment member of claim 30, further comprising a vertical portion which extends between (i) the base portion, and (ii) respective ends of the spring biased angled members.

* * * * *